(12) United States Patent
Dash et al.

(10) Patent No.: US 12,323,894 B2
(45) Date of Patent: Jun. 3, 2025

(54) EMERGENCY SERVICE DELIVERY WITH DYNAMIC SCHEDULING AND PRIORITY

(71) Applicant: Radisys Corporation, Hillsboro, OR (US)

(72) Inventors: Nalinikanta Dash, Odisha (IN); Rajendra Prasad Kodaypak, Hillsboro, OR (US)

(73) Assignee: Radisys Corporation, Hillsboro, OR (US)

( * ) Notice: Subject to any disclaimer, the term of this patent is extended or adjusted under 35 U.S.C. 154(b) by 403 days.

(21) Appl. No.: 18/059,625

(22) Filed: Nov. 29, 2022

(65) Prior Publication Data
US 2024/0179504 A1    May 30, 2024

(51) Int. Cl.
*H04W 4/90* (2018.01)
*H04W 68/00* (2009.01)

(52) U.S. Cl.
CPC ........... *H04W 4/90* (2018.02); *H04W 68/005* (2013.01)

(58) Field of Classification Search
CPC ........ H04W 4/90; H04W 68/005; H04W 4/06
See application file for complete search history.

(56) References Cited

U.S. PATENT DOCUMENTS

| | | | |
|---|---|---|---|
| 2014/0348072 A1* | 11/2014 | May-Weymann .... | H04W 24/00 370/329 |
| 2024/0106554 A1* | 3/2024 | Prakash ................ | H04H 20/71 |
| 2024/0121859 A1 | 4/2024 | Dash et al. | |

FOREIGN PATENT DOCUMENTS

WO    WO-2023055518 A1 *    4/2023

OTHER PUBLICATIONS

ETSI TS 123 041 V17.4.0 (Jun. 2022): Digital cellular telecommunications system (Phase 2+) (GSM) . . . , specification, published by Alliance for Telecommunications Industry Solutions, 2022, 104 pages.
ETSI TS 123 501 V17.6.0 (Sep. 2022): 5G; System and architecture for the 5G System (5GS) (3GPP TS 23.501 version 17.6.0 Release 17), specification, published by Alliance for Telecommunications Industry Solutions, 2022, 573 pages.
ETSI TS 138 401 V17.2.0 (Oct. 2022): 5G; NG-RAN; Architecture description (3GPP TS 38.401 version 17.2.0 Release 17), specification, published by Alliance for Telecommunications Industry Solutions, 2022, 125 pages.

* cited by examiner

*Primary Examiner* — Marcos L Torres
(74) *Attorney, Agent, or Firm* — Stoel Rives LLP

(57) ABSTRACT

Techniques, performed by a distributed unit (DU) for a radio access network (RAN) node in a 5G communication network defining one or more cells, are disclosed for dynamically scheduling SIB8 warning messages. In some embodiments, in response to a write-replace warning request for broadcasting a SIB8 warning message, the DU determines a weightage of the SIB8 warning message; determines, based on the weightage, a system information periodicity for the SIB8 warning message and a change of one or both a default paging cycle and a modification period coefficient parameter to establish an initial delay before broadcasting the SIB8 warning message; and schedules a broadcast of the SIB8 warning message with broadcast timing based on the system information periodicity and pre-provisioned default paging cycle and modification period coefficient parameters.

24 Claims, 20 Drawing Sheets

| Bit | Short Message |
|---|---|
| Bit 1 (MSB) | systemInfoModification<br>If set to 1: indication of a BCCH modification other than SIB6, SIB7 and SIB8 |
| Bit 2 | etwsAndCmasIndication<br>If set to 1: indication of an ETWS primary and/or secondary notification and/or a CMAS notification |
| Bit 3-8 | Not used in 3GPP release 15.6 version, and shall be ignored by UE if received |

FIG. 7

| CMAS Timing Parameter | Value |
|---|---|
| modificationPeriodCoeff | ENUMERATED {n2, n4, n8, n16} |
| defaultPagingCycle | ENUMERATED {rf32, rf64, rf128, rf256} |
| system information modification period | modificationPeriodCoeff × defaultPagingCycle |
| si-Periodicity | ENUMERATED {rf8, rf16, rf32, rf64, rf128, rf256, rf512} |

FIG. 8

```
v si-SchedulingInfo
  v schedulingInfoList: 2 items
    > Item 0
    v Item 1
      v SchedulingInfo
          si-BroadcastStatus: broadcasting (0)
          si-Periodicity: rf64 (3)
          sib-MappingInfo: 1 item
          v Item 0
            v SIB-TypeInfo
                type: sibType8 (6)
                areaScope: true (0)
  si-WindowLength: s40 (3)
```

FIG. 10

| SIB8 | |
|---|---|
| messageIdentifier | BIT STRING ( SIZE (16) ) |
| serialNumber | BIT STRING ( SIZE (16) ) |
| warningMessageSegmentType | ENUMERATED {notLastSegment, lastSegment} |
| warningMessageSegmentNumber | INTEGER (0 ... 63) |
| warningMessageSegment | OCTET STRING |
| dataCodingScheme | OCTET STRING ( SIZE (1) ) |
| warningAreaCoordinatesSegment | OCTET STRING |

FIG. 11

EMERGENCY SERVICE DELIVERY WITH DYNAMIC SCHEDULING AND PRIORITY

TECHNICAL FIELD

This application relates generally to wireless communication systems, and more specifically to techniques for intelligent MAC layer scheduling within RAN and O-RAN (O-DU) networking domains in 5G systems.

BACKGROUND INFORMATION

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi®.

In 3GPP radio access networks (RANs) in LTE systems, the base station can include a RAN node such as an Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next-generation Node B or g Node B (gNB)).

RANs use a radio access technology (RAT) to communicate between the RAN node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

An Open Radio Access Network (O-RAN) is a disaggregated approach to deploying mobile fronthaul and midhaul networks built on cloud native principles. O-RAN is an evolution of the Next Generation RAN (NG-RAN) architecture, first introduced by the GSMA's 3GPP in its release 15 (5G version 1) technical specification TS 38.401. The O-RAN Alliance formed to undertake the advancement of NG-RAN philosophies, expanding on the scope of what was originally outlined by the 3GPP. An O-RAN includes an O-RAN radio unit (O-RU), an O-RAN distributed unit (O-DU), and an O-RAN central unit (O-CU).

System information (SI) in 5G includes a master information block (MIB) and system information blocks (SIBs). The minimum SI for a UE to camp on a cell is provided by a MIB and SIB1. The UE acquires the SI upon cell selection (e.g., upon power on), upon cell-reselection, upon return from out of coverage, after reconfiguration with sync completion, after entering the network from another RAT, upon receiving an indication that the SI has changed, upon receiving a public warning system (PWS) notification, and whenever the UE does not have a valid version of a stored SIB.

SIB1 carries the information required for the UE to access the cell, e.g., random access parameters. SIB1 includes information regarding the availability and scheduling of other SIBs, e.g., mapping of SIBs to SI message, periodicity, SI-window size, etc. SIB1 also indicates whether one or more SIBs are only provided on-demand, in which case it may also provide PRACH configuration needed by the UE to request for the required SI. SIB1 is transmitted on the DL-SCH (logical channel, BCCH) with a periodicity of 160 ms and variable transmission repetition periodicity within 160 ms. SIB1 is cell-specific SIB.

Aside from SIB1, other SIBs having the same periodicity can be mapped to the same SI message. Each SI message is sent within periodically occurring time domain windows called SI-windows and only one window length is defined for all SI messages. Each SI message is sent within the corresponding SI-window and the SI-windows of different SI messages do not overlap. An SI message may be transmitted a number of times within the SI window. Any SIB except SIB1 can be configured to be either cell specific or area specific, using an indication in SIB1. Other SI can be transmitted in the following ways: periodically broadcast on DL-SCH, broadcast on-demand on DL-SCH (i.e., upon explicit request from UEs), or sent in a dedicated manner on DL-SCH to UEs in RRC_CONNECTED.

3GPP networks support the PWS to alert the public to events such as disasters. For instance, when earthquakes, tsunamis, hurricanes, or wildfires occur, the PWS can be used to notify people to evacuate impacted areas within a certain time. In addition, the PWS can be used to notify people of a child abduction emergency (e.g., AMBER alert). Different countries may have different requirements on delivery of warning messages. Thus, 3GPP networks provide different warning systems for different countries, such as the earthquake and tsunami warning system (ETWS) first developed for use in Japan; wireless emergency alert (WEA, formerly known as the Commercial Mobile Alert System (CMAS), and prior to that as the Personal Localized Alerting Network (PLAN)) in the United States; the Korean public alert system (KPAS); and EU-ALERT.

SUMMARY OF THE DISCLOSURE

Wireless emergency alerting over 5G networks is a mission critical regulatory broadcast service to be provided by mobile network operators as they deploy their next-generation cloud native network infrastructure solutions offering mobility services. Notably, however, all received CMAS warning messages would be treated with equal priority. (Skilled persons will appreciate that the terms CMAS and SIB8 warning message are used as synonyms in this disclosure.)

All factors affecting scheduling of warning messages such as paging cycle, modification period coefficient, system information periodicity, and the like use same value configured through operation and maintenance (OAM) or through service management and orchestration (SMO) using O1 interface during initial provisioning, across all received CMAS warning messages. When these alerts are triggered by the regulatory agency and delivered to the RAN network enabled by macro/small cells, the intelligence within the network architecture design will determine the reliability, efficiency, and accuracy of the service delivery in conjunction with other mobility services offered to the customers. In critical scenarios, there could be strict service level agreements enforced by carriers to ensure such a service delivery.

PWS is a regulatory/emergency alerting service that needs to be scheduled and delivered with a high degree of reliability and accuracy in a mobile operator network. Mobility network functions in the end-to-end warning message transmission path need to be capable of exchanging various procedures with maximum reliability and accuracy. Traditional methods of RAN scheduling limit operators in optimizing their network resources and lead to cumbersome radio designs in order to meet a wider geographic coverage area. Lack of dynamic scheduling of warning messages at a MAC scheduler in a DU, message resource requirements, priority, weightage, and dynamic allocation needs for devices served by the RAN, with variable modes of operation and services could significantly limit the O-RAN performance.

To overcome such limitations and enhance the O-RAN network intelligence, disclosed are dynamic scheduling techniques to inspect the incoming warning messages in terms of their identity (e.g., priority) and allocate appropriate weight factors to control the scheduling periodicity of warning SIB messages in conjunction with the services being consumed by the end users/devices as well as the instantaneous resources consumed by the MAC DU network function. The disclosed techniques ensure reliable, measurable, cost-effective, and flexible O-RAN design that can deliver superior performance. The disclosed embodiments enable global operators to license and deploy intelligent/advanced MAC layer scheduling within traditional RAN and O-RAN (O-DU) networking domains. Significant capital expenditure/operating expense savings can be realized when deploying licensed software features in the O-RAN network functions (O-DU) during rollout of commercial mobility services. Data analytics-driven insights from MAC scheduling enables operators to maximize their RAN infrastructure investments and enable usage-driven growth on demand.

In one aspect, a distributed unit (DU) for a RAN node in a 5G communication network defining one or more cells is configured to, in response to a write-replace warning request for broadcasting a SIB8 warning message, determine a weightage of the SIB8 warning message; determine, based on the weightage, a system information periodicity for the SIB8 warning message and a change of one or both a default paging cycle and a modification period coefficient parameter so that the change corresponds to an initial delay before broadcasting the SIB8 warning message; and schedule a broadcast of the SIB8 warning message with broadcast timing based on the system information periodicity and pre-provisioned default paging cycle and modification period coefficient parameters.

Additional aspects and advantages will be apparent from the following detailed description of embodiments, which proceeds with reference to the accompanying drawings.

BRIEF DESCRIPTION OF THE DRAWING FIGURES

To easily identify the discussion of any particular element or act, the most significant digit or digits in a reference number refer to the figure number in which that element is first introduced.

FIG. 7 is a table showing a short message for indicating a change in system information, in accordance with one embodiment.

FIG. 8 is a table showing CMAS timing parameters, in accordance with one embodiment.

FIG. 10 is an ASN data structure for si-SchedulingInfo including and si-Periodicity, in accordance with one embodiment.

FIG. 11 is a table showing SIB8 contents, in accordance with one embodiment.

DETAILED DESCRIPTION OF EMBODIMENTS

Figure 1:
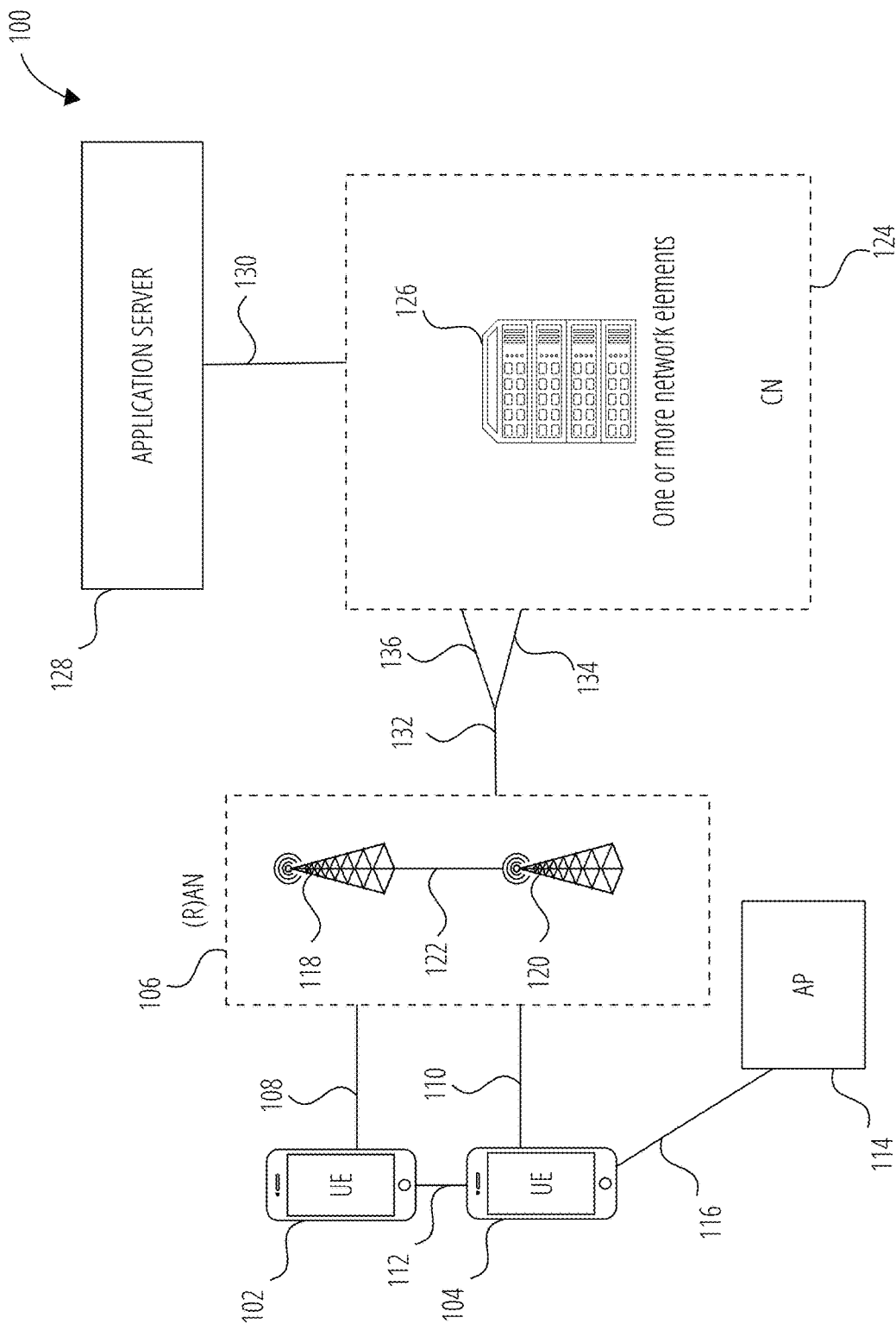
FIG. 1 is a block diagram of a wireless communications system, in accordance with one embodiment.

FIG. 1 illustrates an example architecture of a system 100 of a network, in accordance with various embodiments. The following description is provided for an example system 100 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 1, system 100 includes UE 102 and UE 104. In this example, UE 102 and UE 104 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, UE 102 and/or UE 104 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

UE 102 and UE 104 may be configured to connect, for example, communicatively couple, with an access node or radio access node (shown as (R)AN 106). In embodiments, (R)AN 106 may be an NG-RAN or a 5G RAN, an E-UTRAN, or a legacy RAN, such as a UTRAN or GERAN. As used herein, the term "NG-RAN" or the like may refer to a (R)AN 106 that operates in an NR or 5G system, and the term "E-UTRAN" or the like may refer to a (R)AN 106 that operates in an LTE or 4G system. UE 102 and UE 104 utilize connections (or channels) (shown as connection 108 and connection 110, respectively), each of which comprises a physical communications interface or layer (discussed in further detail below).

In this example, connection 108 and connection 110 are air interfaces to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, an NR protocol, and/or any of the other communications protocols discussed herein. In embodiments, UE 102 and UE 104 may directly exchange communication data via a ProSe interface 112. ProSe interface 112 may alternatively be referred to as a sidelink (SL) interface 110 and may comprise one or more logical channels, including, but not limited to, a PSCCH, a PSSCH, a PSDCH, and a PSBCH.

UE 104 is shown to be configured to access an AP 114 (also referred to as "WLAN node," "WLAN," "WLAN Termination," "WT," or the like) via connection 116. Connection 116 can comprise a local wireless connection, such as a connection consistent with any IEEE 802.11 protocol, wherein the AP 114 would comprise a wireless fidelity (Wi-Fi®) router. In this example, AP 114 may be connected to the Internet without connecting to the core network of the wireless system (described in further detail below). In various embodiments, UE 104, (R)AN 106, and AP 114 may be configured to utilize LWA operation and/or LWIP operation. The LWA operation may involve UE 104 in RRC_CONNECTED being configured by RAN node 118 or RAN node 120 to utilize radio resources of LTE and WLAN. LWIP operation may involve UE 104 using WLAN radio resources (e.g., connection 116) via IPsec protocol tunneling to authenticate and encrypt packets (e.g., IP packets) sent over connection 116. IPsec tunneling may include encapsulating the entirety of original IP packets and adding a new packet header, thereby protecting the original header of the IP packets.

(R)AN 106 can include one or more AN nodes, such as RAN node 118 and RAN node 120, that enable the connection 108 and connection 110. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs, or TRPs, and so forth, and can comprise ground stations (e.g., terrestrial access points) or satellite stations providing coverage within a geographic area (e.g., a cell). As used herein, the term "NG-RAN node" or the like may refer to a RAN node that operates in an NR or 5G system (for example, a gNB), and the term "E-UTRAN node" or the like may refer to a RAN node that operates in an LTE or 4G system 100 (e.g., an eNB). According to various embodiments, RAN node 118 or RAN node 120 may be implemented as one or more of a dedicated physical device such as a macrocell base station, and/or a low-power base station for providing femtocells, picocells, or other like cells having smaller coverage areas, smaller user capacity, or higher bandwidth compared to macrocells.

In some embodiments, all or parts of RAN node 118 or RAN node 120 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes (e.g., RAN node 118 or RAN node 120); a MAC/PHY split wherein RRC, PDCP, RLC, and MAC layers are operated by the CRAN/vBBUP and the PHY layer is operated by individual RAN nodes (e.g., RAN node 118 or RAN node 120); or a "lower PHY" split wherein RRC. PDCP, RLC, MAC layers, and upper portions of the PHY layer are operated by the CRAN/vBBUP and lower portions of the PHY layer are operated by individual RAN nodes. This virtualized framework allows the freed-up processor cores of the RAN node 118 or RAN node 120 to perform other virtualized applications. In some implementations, an individual RAN node may represent individual gNB—DUs that are connected to a gNB-CU via individual F1 interfaces (not shown by FIG. 1). In these implementations, the gNB-DUs may include one or more remote radio heads or RFEMs, and the gNB-CU may be operated by a server that is located in (R)AN 106 (not shown) or by a server pool in a similar manner as the CRAN/vBBUP. Additionally, or alternatively, one or more of RAN node 118 or RAN node 120 may be next-generation eNBs (ng-eNBs), which are RAN nodes that provide E-UTRA user plane and control plane protocol terminations toward UE 102 and UE 104, and are connected to a 5GC via an NG interface. In V2X scenarios one or more of RAN node 118 or RAN node 120 may be or act as RSUs.

The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs (vUEs). The RSU may also include internal data storage circuitry to store intersection map geometry, traffic statistics, media, and applications/software to sense and control ongoing vehicular and pedestrian traffic. The RSU may operate on the 5.9 GHZ Direct Short Range Communications (DSRC) band to provide very low latency communications required for high-speed events, such as crash avoidance, traffic warnings, and the like. Additionally, or alternatively, the RSU may operate on the cellular V2X band to provide the aforementioned low latency communications, as well as other cellular communications services. Additionally, or alternatively, the RSU may operate as a Wi-Fi® hotspot (2.4 GHz band) and/or provide connectivity to one or more cellular networks to provide uplink (UL) and downlink (DL) communication. The computing device(s) and some or all of the radio frequency circuitry of the RSU may be packaged in a weatherproof enclosure suitable for outdoor installation, and may include a network interface controller to provide a wired connection (e.g., Ethernet) to a traffic signal controller and/or a backhaul network.

RAN node 118 and/or RAN node 120 can terminate the air interface protocol and can be the first point of contact for UE 102 and UE 104. In some embodiments, RAN node 118 and/or RAN node 120 can fulfill various logical functions for (R)AN 106 including, but not limited to, RNC functions such as radio bearer management, uplink and downlink dynamic radio resource management and data packet scheduling, and mobility management.

In embodiments, UE 102 and UE 104 can be configured to communicate using OFDM communication signals with each other or with RAN node 118 and/or RAN node 120 over a multicarrier communication channel in accordance with various communication techniques, such as, but not limited to, an OFDMA communication technique (e.g., for downlink communications) or an SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from RAN node 118 and/or RAN node 120 to UE 102 and UE 104, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. Several different physical downlink channels are conveyed using such resource blocks.

According to various embodiments, UE 102 and UE 104 and RAN node 118 and/or RAN node 120 communicate data (for example, transmit and receive) over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, UE 102 and UE 104 and RAN node 118 or RAN node 120 may operate using LAA, eLAA, and/or feLAA mechanisms. In these implementations, UE 102 and UE 104 and RAN node 118 or RAN node 120 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier-sensing operations may be performed according to a listen-before-talk (LBT) protocol.

LBT is a mechanism whereby equipment (for example, UE 102 and UE 104, RAN node 118 or RAN node 120, etc.) senses a medium (for example, a channel or carrier frequency) and transmits when the medium is sensed to be idle (or when a specific channel in the medium is sensed to be unoccupied). The medium-sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 102, AP 114, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (μs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15, or 20 MHz and a maximum of five CCs can be aggregated, and therefore a maximum aggregated bandwidth is 100 MHZ. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC- and NAS-related activities. The other serving cells are referred to as SCells, and each SCell may provide an individual SCC for both UL and DL. The SCCs may be added and removed as required, while changing the PCC may require UE 102 to undergo a handover. In LAA, cLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher layer signaling to UE 102 and UE 104. The PDCCH carries information about the transport format and resource allocations related to the PDSCH channel, among other things. It may also inform UE 102 and UE 104 about the transport format, resource allocation, and HARQ information related to the uplink shared channel. Typically, downlink scheduling (assigning control and shared channel resource blocks to UE 104 within a cell) may be performed at any of RAN node 118 or RAN node 120 based on channel quality information fed back from any of UE 102 and UE 104. The downlink resource assignment information may be sent on the PDCCH used for (e.g., assigned to) each of UE 102 and UE 104.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as EREGs. An ECCE may have other numbers of EREGs in some situations.

RAN node 118 or RAN node 120 may be configured to communicate with one another via interface 122. In embodiments where system 100 is an LTE system (e.g., when CN 124 is an EPC), interface 122 may be an X2 interface. The X2 interface may be defined between two or more RAN nodes (e.g., two or more eNBs and the like) that connect to an EPC, and/or between two eNBs connecting to the EPC. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB, information about successful in sequence delivery of PDCP PDUs to a UE 102 from an SeNB for user data, information of PDCP PDUs that were not delivered to a UE 102, information about a current minimum desired buffer size at the Se NB for transmitting to the UE user data, and the like. The X2-C may provide intra-LTE access mobility functionality, including context transfers from source to target eNBs, user plane transport control, etc.; load management functionality; and inter-cell interference coordination functionality.

In embodiments where system 100 is a 5G or NR system (e.g., when CN 124 is a 5GC), interface 122 may be an Xn interface. The Xn interface is defined between two or more RAN nodes (e.g., two or more gNBs and the like) that connect to a 5GC, between a RAN node 118 (e.g., a gNB) connecting to a 5GC and an eNB, and/or between two eNBs connecting to a 5GC (e.g., CN 124). In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface, and mobility support for UE 102 in a connected mode (e.g., CM-CONNECTED) including functionality to manage the UE mobility for connected mode between one or more RAN node 118 or RAN node 120. The mobility support may include context transfer from an old (source) serving RAN node 118 to new (target) serving RAN node 120, and control of user plane tunnels between old (source) serving RAN node 118 to new (target) serving RAN node 120. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

(R)AN 106 is shown to be communicatively coupled to a core network in this embodiment, CN 124. CN 124 may comprise one or more network elements 126, which are configured to offer various data and telecommunications services to customers/subscribers (e.g., users of UE 102 and UE 104) who are connected to CN 124 via (R)AN 106. The components of CN 124 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of CN 124 may be referred to as a network slice, and a logical instantiation of a portion of CN 124 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, an application server 128 may be an element offering applications that use IP bearer resources with the core network (e.g., UMTS PS domain, LTE PS data services, etc.). The application server 128 can also be configured to support one or more communication services (e.g., VOIP sessions, PTT sessions, group communication sessions, social networking services, etc.) for UE 102 and UE 104 via the EPC. Application server 128 may communicate with CN 124 through an IP communications interface 130.

In embodiments, CN 124 may be a 5GC. As described in 3GPP TS 23.501, 5G CN 124 includes an access and mobility management function (AMF), a user plane function (UPF), a session management function (SMF), an authentication server function (AUSF), a network exposure function (NEF), a unified data management (UDM), a unified data repository (UDR), a short message service function (SMSF), a non-3GPP interworking function (N3IWF), and other 5G core network functions. A charging function (CHF) introduced in the 5G system architecture allows charging services to be offered in connection with an operations support system and a business support system (OSS/BSS).

(R)AN 106 may be connected with CN 124 via an NG interface 132. In embodiments, NG interface 132 may be split into two parts, an NG user plane (NG-U) interface 134, which carries traffic data between RAN node 118 or RAN node 120 and a UPF, and NG control plane (NG-C) interface 136, which is a signaling interface between RAN node 118 or RAN node 120 and AMFs.

In embodiments, CN 124 may be a 5G CN, while in other embodiments, CN 124 may be an EPC). Where CN 124 is an EPC, (R)AN 106 may be connected with CN 124 via an S1 interface 132. In embodiments, SI interface 132 may be split into two parts, an S1 user plane (S1-U) interface 134, which carries traffic data between RAN node 118 or RAN node 120 and S-GW, and an S1-MME control plane interface 136, which is a signaling interface between RAN node 118 or RAN node 120 and MMEs.

Figure 2:
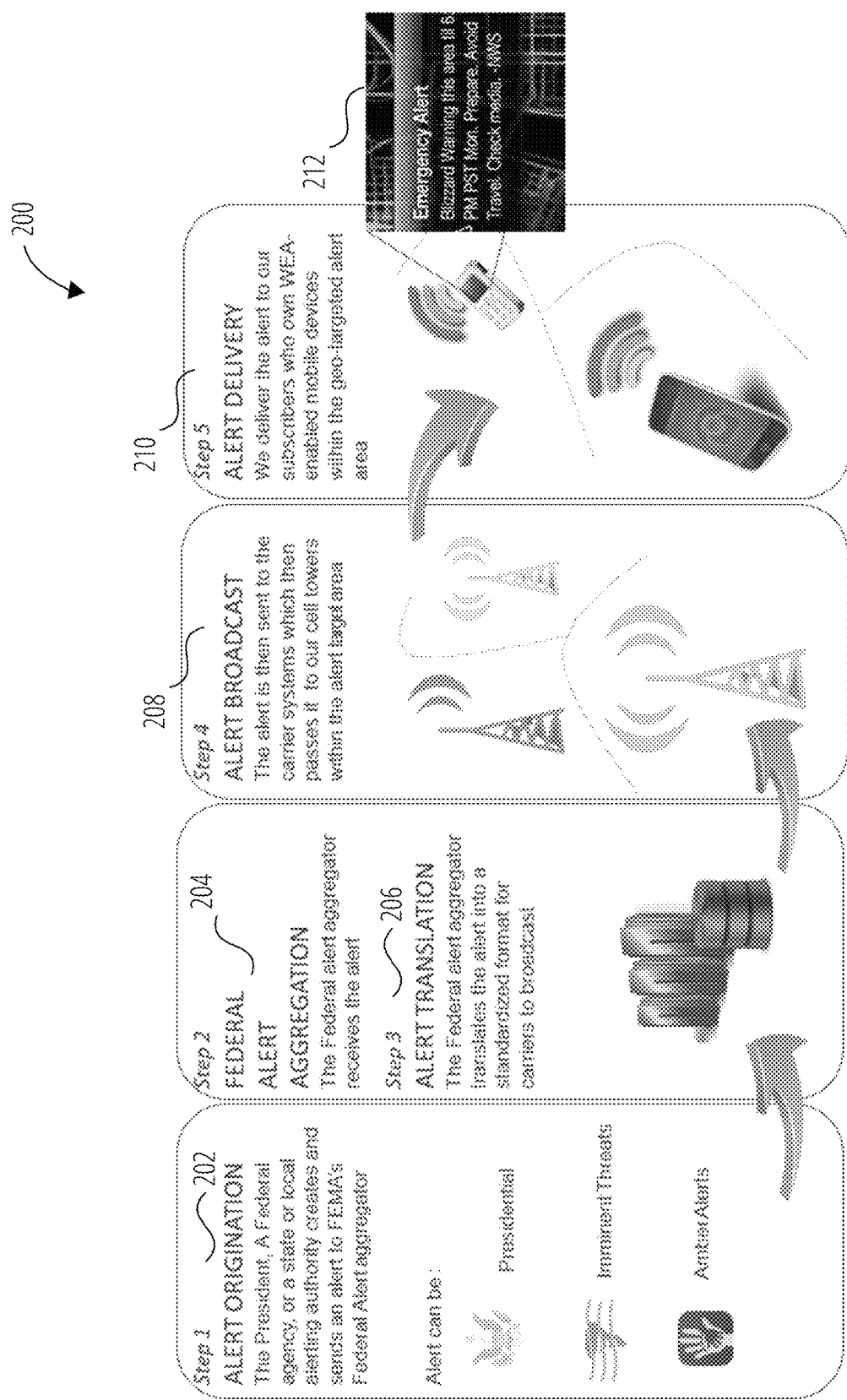
FIG. 2 is an annotated flow diagram showing warning alert origination and delivery, according to one embodiment.

FIG. 2 shows a process 200 for WEAs. Initially, process 200 entails originating 202 an emergency alert from the President of the United States, the National Weather Service (NWS), or other emergency operations centers. Next, process 200 entails federal agencies (e.g., FEMA) aggregating 204 alerts at a federal alert aggregator. Process 200 then entails translating 206 the information to a standardized format for different participating cellular service providers to distribute the alerts to their customers with compatible devices via cell broadcast. These carriers may then begin broadcasting 208 the warnings to an alert target area using SIBs. Accordingly, process 200 entails delivery 210 of the warnings to different UEs to all phones using a cell tower. The UEs may then display 212 the warnings.

Figure 3:
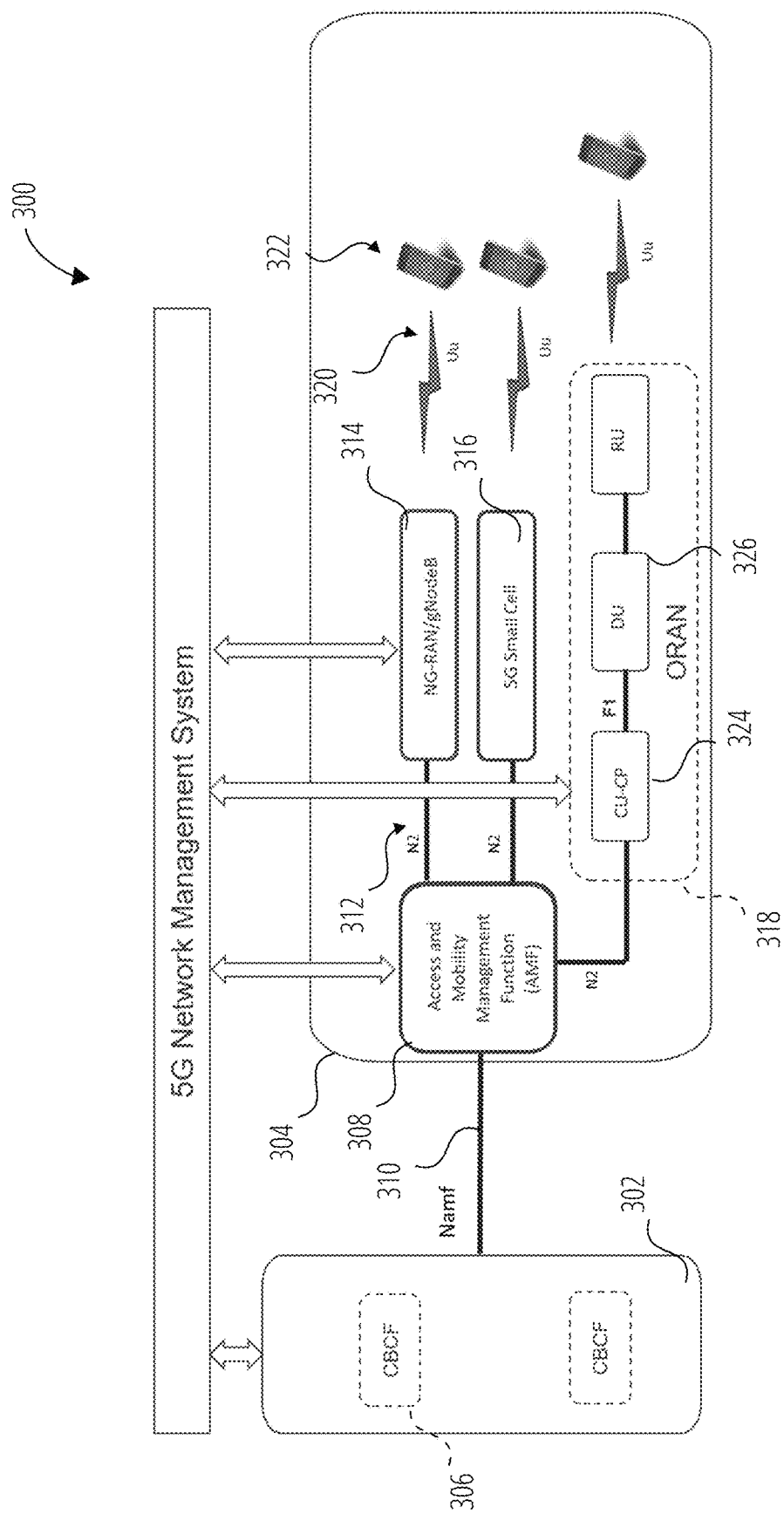
FIG. 3 is an annotated block diagram of a system for cellular warning alert delivery over 5G networks, according to one embodiment.

FIG. 3 shows a high-level 5G PWS architecture 300 for a WEA system. In this example, a cell broadcast center (CBC) 302 is in communication with a 5G mobility network 304. CBC 302 includes a cell broadcast center function (CBCF) 306 communicatively coupled to an AMF 308 through a Namf interface 310 in 5G mobility network 304.

In this example, 5G mobility network 304 includes an AMF 308 that has a N2 interface 312 for each of an NG-RAN/gNB 314, a 5G small cell 316, and an O-RAN 318. Each of NG-RAN/gNB 314, 5G small cell 316, and O-RAN 318 has an air Uu interface 320 with an associated UE 322. Accordingly, 5G mobility network 304 provides for broadcasting of warning messages requested over N2 interface 312 from the 5GC by means of system information broadcasting (SIB6/SIB7/SIB8) towards UE 322 over the NR-Uu interface 320. If the request is determined as a primary ETWS notification, then SIB6 will be generated. For a secondary ETWS notification, SIB7 will be generated. For both primary and secondary ETWS notification, then both SIB6 and SIB7 will be generated. And for CMAS (WEA), SIB8 will be generated at the CU-CP.

With reference to O-RAN 318, and as explained in U.S. patent application Ser. No. 17/938,240, filed Oct. 5, 2022 by the present applicant, Radisys Corporation, broadcasting of a warning message is triggered by CBCF 306, which interfaces to the regulatory agency via a broadcasting entity and/or gateway in the carrier network. Broadcasting of a warning message from NG-RAN/gNB 314 is similar and implemented using its CU and DU equivalent control plane functions (not shown).

For instance, AMF 308 in a 5G core network receives from CBCF 306 the trigger and sends a write-replace warning request towards an O-CU 324 (shown as a control plane CU). Based on the reception of a warning request from AMF 308, O-CU 324 then triggers delivery of a write-replace warning request towards an O-DU 326. (This is a control plane procedure and thus the CU-CP is involved in sending the message towards O-DU 326.)

For the warning request that is originated from the core and delivered by the RAN to the digital endpoints/devices, there is a feedback process that delivers an acknowledgment by sending write-replace warning response back from O-RAN 318 to the core.

Figure 4:
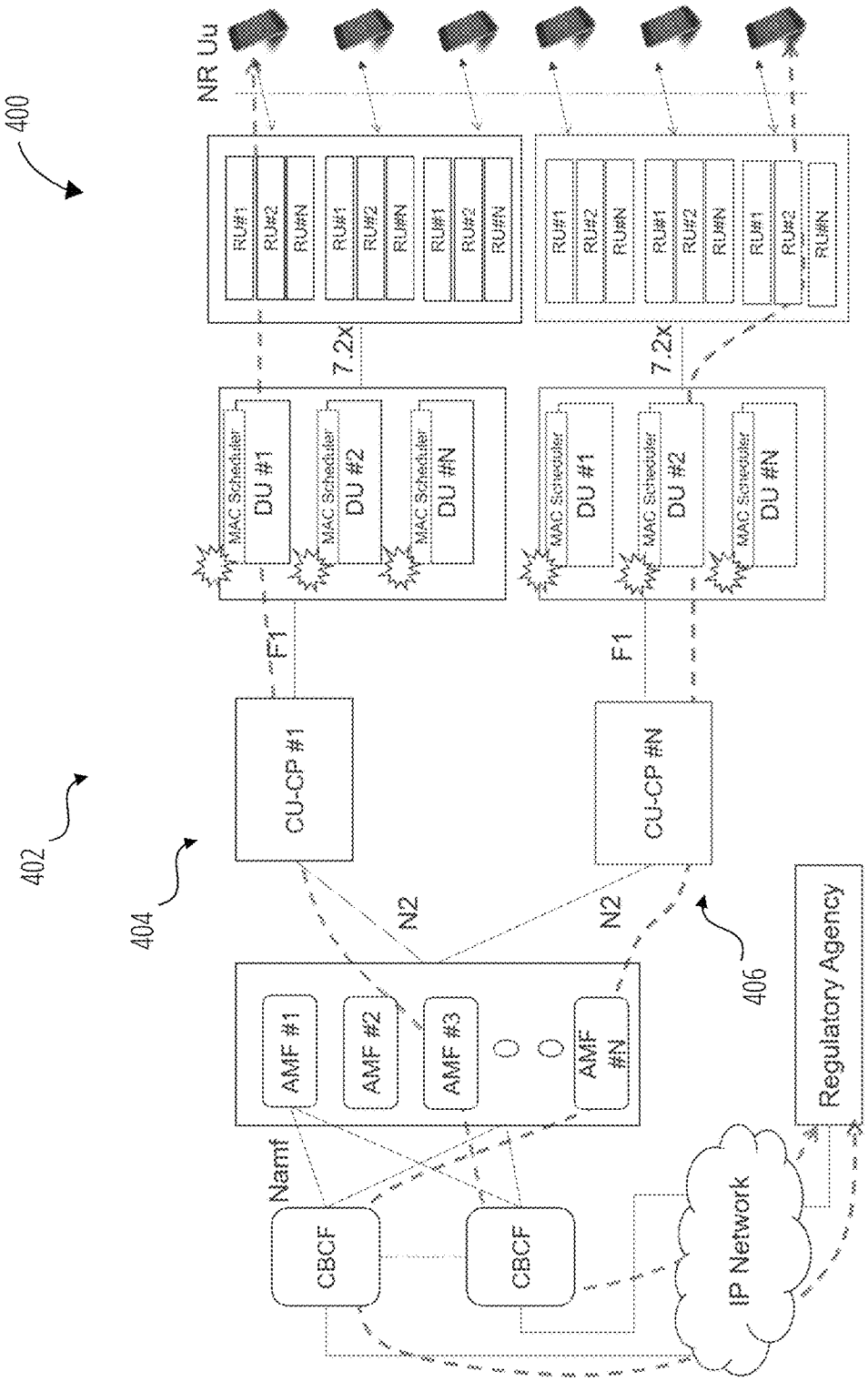
FIG. 4 is a block diagram showing in greater detail 5G distributed O-RAN examples of the system shown in FIG. 3, according to one embodiment.

FIG. 4 shows an example of PWS delivery in a disaggregated O-RAN architecture 400 providing a 5G O-RAN-enabled mobility network 402. In this example, disaggregated O-RAN architecture 400 includes an O-RAN 404 and an O-RAN 406. Each O-RAN 404, 406 includes a CU in communication with multiple DUs over an F1 interface. The DUs are in communication with multiple RUs. Thus, dashed lines show how public warning messages are directed to a specific RU, in the example of FIG. 4.

In 5G O-RAN-enabled mobility network 402, a MAC scheduler is implemented within each DU network function. The MAC scheduler handles scheduling of radio resources associated with over-the-air broadcast warning messages service delivery upon reception of the warning request from a corresponding CU. These messages are delivered via the SIB procedures.

Figure 5:
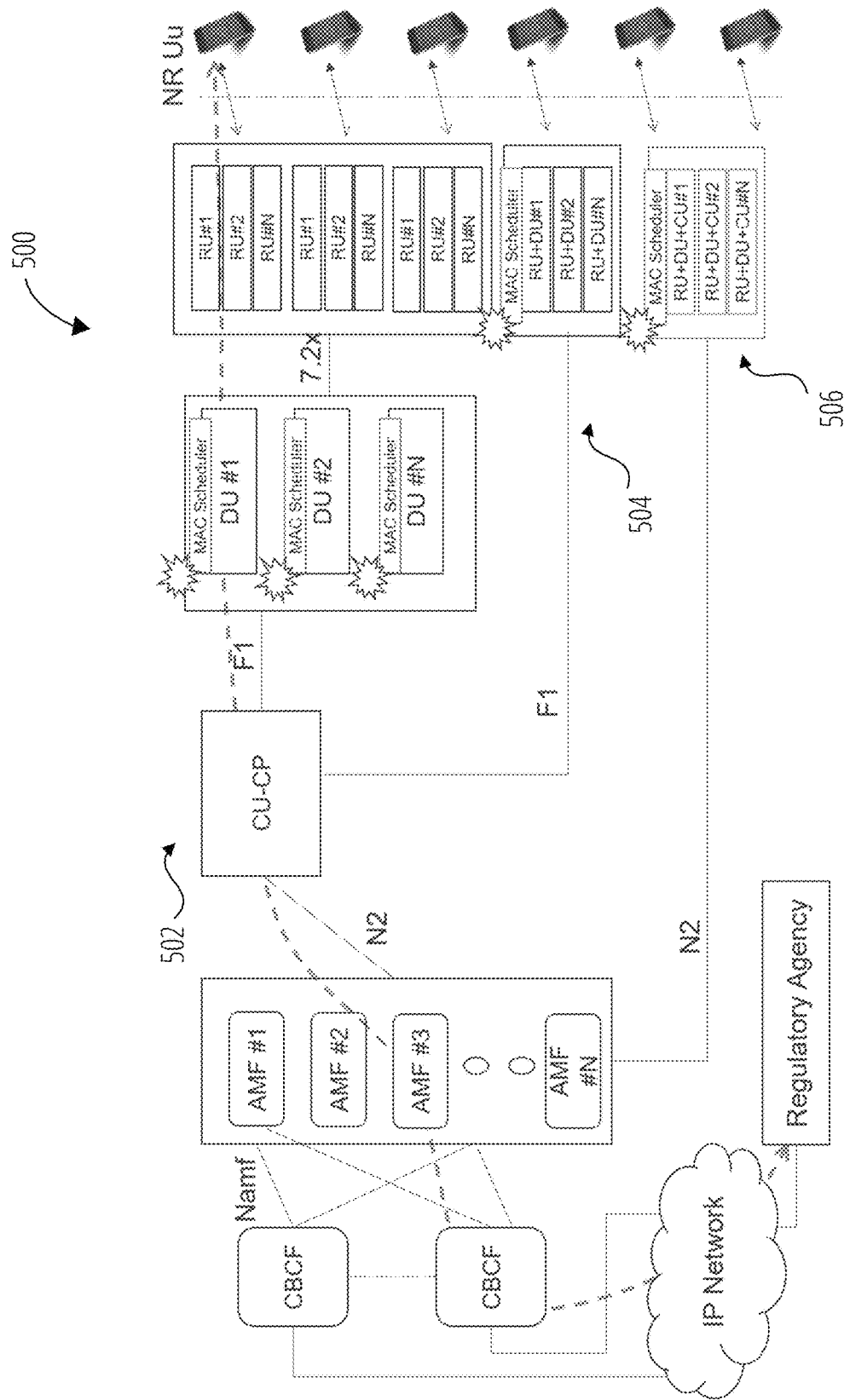
FIG. 5 is a block diagram showing in greater detail 5G distributed and integrated O-RAN examples of the system shown in FIG. 3, according to one embodiment.

FIG. 5 shows another example of PWS delivery in different O-RAN architectures 500. A first O-RAN 502 is disaggregated with a MAC scheduler for each DU, as explained in the previous example of FIG. 4. A second O-RAN 504 shares a CU with first O-RAN 502, but its DUs and RUs are aggregated and controlled by a common MAC scheduler. Finally, a third O-RAN 506 has aggregated CUs, DUs, and RUs controlled with a common MAC scheduler.

Figure 6:
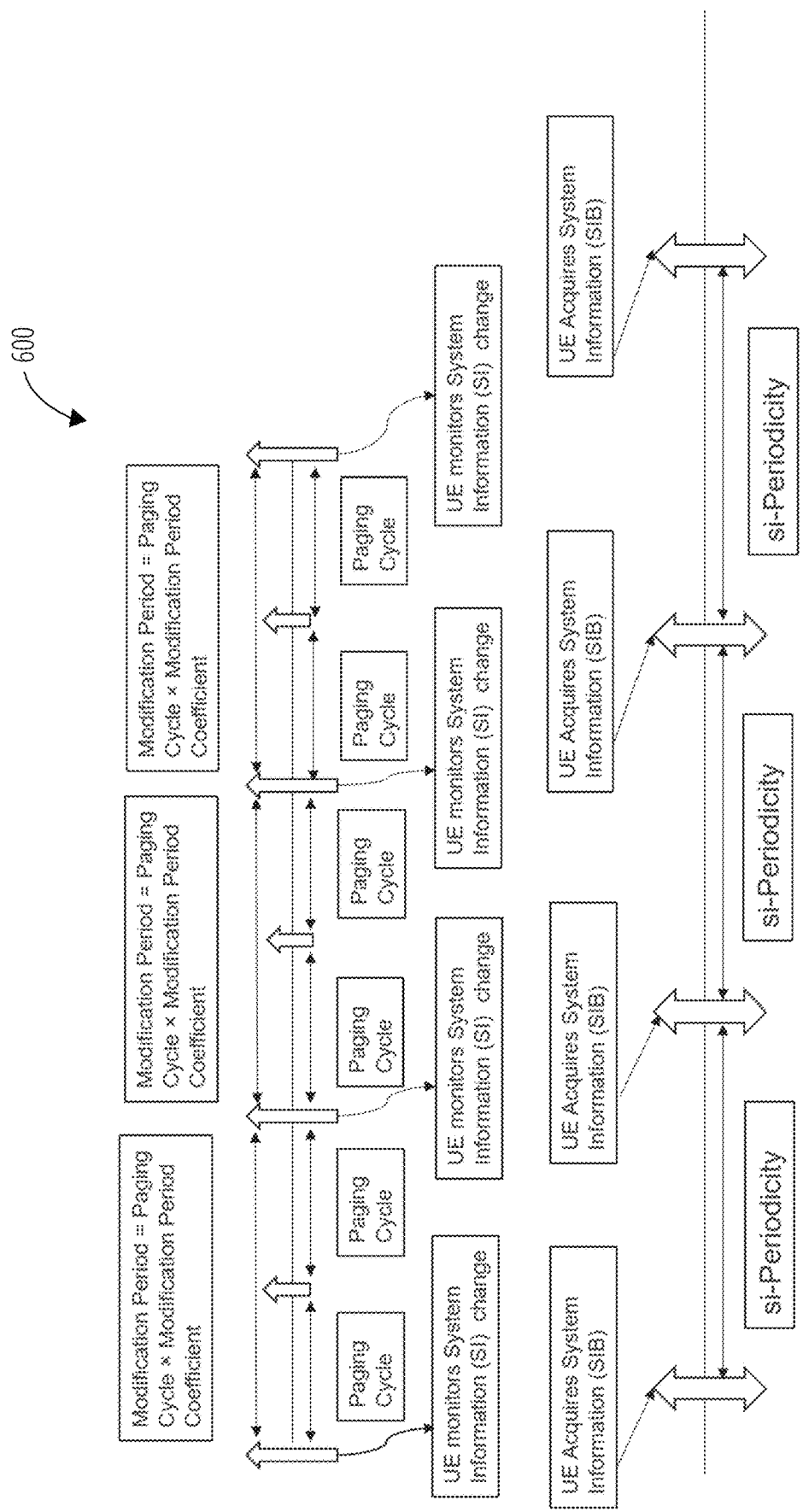
FIG. 6 is an annotated timing diagram showing conventional scheduling for SIB8 warning messages, according to one embodiment.

FIG. 6 shows a timing diagram 600 for scheduling warning messages. In general, the timing factors that control scheduling of CMAS warning messages include paging cycle, system information modification period, and system information periodicity.

Change of SI (other than for ETWS and CMAS) occurs at specific radio frames, i.e., the concept of a modification period is used. The modification period is configured by SIB1 via modificationPeriodCoeff, described later with reference to FIG. 8 and FIG. 9. The modification period boundaries are defined by SFN values for which SFN mod m=0, where m is the number of radio frames comprising the modification period. SI may be transmitted a number of times with the same content within a modification period.

When the network changes SI, it first notifies the UEs about this change, i.e., this may be done throughout a modification period. In the next modification period, the network transmits the updated SI. Upon receiving a change notification, the UE acquires the new SI immediately from the start of the next modification period. The UE applies the previously acquired SI until the UE acquires the new SI.

As explained later with reference to FIG. 14 and FIG. 15, the UE receives indications about SI modifications and/or PWS notifications using a short message transmitted with P-RNTI over DCI. DCI format 1_0 scrambled with P-RNTI is used for this purpose. The short message received within DCI is an eight-bit field, which is interpreted as shown in FIG. 7. If the received short message indicates there is an ETWS/CMAS notification, then the UE would immediately reacquire SIB1. Based on scheduling information, the UE would the acquire the corresponding warning SIBs (e.g., SIB8).

FIG. 8 is table showing values for CMAS timing parameters including modification period coefficient, default paging cycle, system information modification period, and system information periodicity. The left column shows the name of the timing parameter, and the right side shows the accepted values in terms of "rf," where means radio frame time (i.e., rf32 means a period of 32 radio frames).

Figure 9:
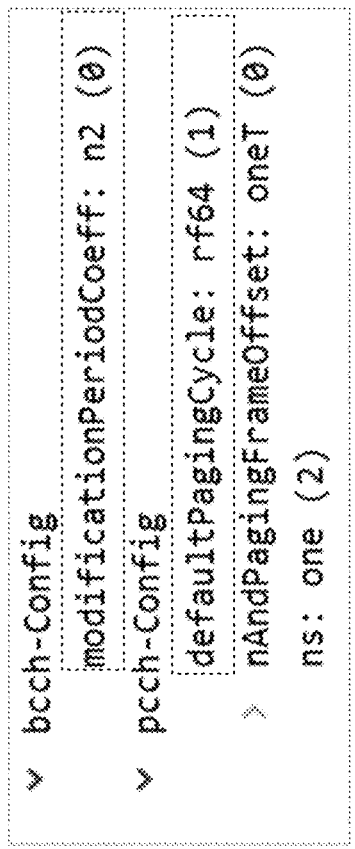
FIG. 9 is an abstract syntax notation (ASN) data structure for a modificationPeriodCoeff and a defaultPagingCycle, in accordance with one embodiment.

FIG. 9 shows an ASN for configuring values of defaultPagingCycle and modificationPeriodCoeff shown in FIG. 8. DefaultPagingCycle and modificationPeriodCoeff values are broadcasted within SIB1 in, respectively, pcch-Config and bech-Config. Values for both parameters may be received from OAM or from SMO in case of O-RAN architecture during initial provisioning.

FIG. 10 shows an ASN for configuring si-Periodicity, which is also provisioned using OAM or SMO. In SIB1, si-SchedulingInfo includes a schedulingInfoList, which contains a list (maximum 32) of scheduling information for SI messages. For each item in the list, SchedulingInfo provides information on whether the corresponding SI message is being broadcasted or not, periodicity of the SI message, and a list of SIBs mapped to this SI message. For each SIB, SIB type, valueTag, and areaScope flag are provided. The areaScope indicates whether the SIB is area specific or not.

For acquiring an SI message, a UE determines a start of an SI window (radio frame and slot number) for the concerned SI message. For the concerned SI message, the UE determines the number "n" which corresponds to the order of entry in the list of SI messages configured by schedulingInfoList. The UE determine the integer value "x" such that x=(n−1)×w, where w is the si-WindowLength. The start SFN of the SI window is determined by SFN mod T=FLOOR(x/N), where T is the si-Periodicity of the concerned SI message and N is the number of slots in a radio frame. The starting slot of the SI window in the SFN (determined above) is given by x mod N.

FIG. 11 shows the format of an SIB8 message. In particular, messageIdentifier identifies the source and type of CMAS notification using 16-bit string. Different message identifiers are defined for PWS in section 9.4.1.2.2 of 3GPP TS 23.041. Warning messages, as defined per 3GPP standards, have different message identifiers that indicate their relative priority and significance. Per 3GPP standards, TS 23.041 section 9.4.1.2.2 defines mapping of different message identifiers and corresponding warning messages. Some of the CMAS warning messages have higher priority than others. For lower priority CMAS warning messages, subscribers have options to opt out.

Figure 12:
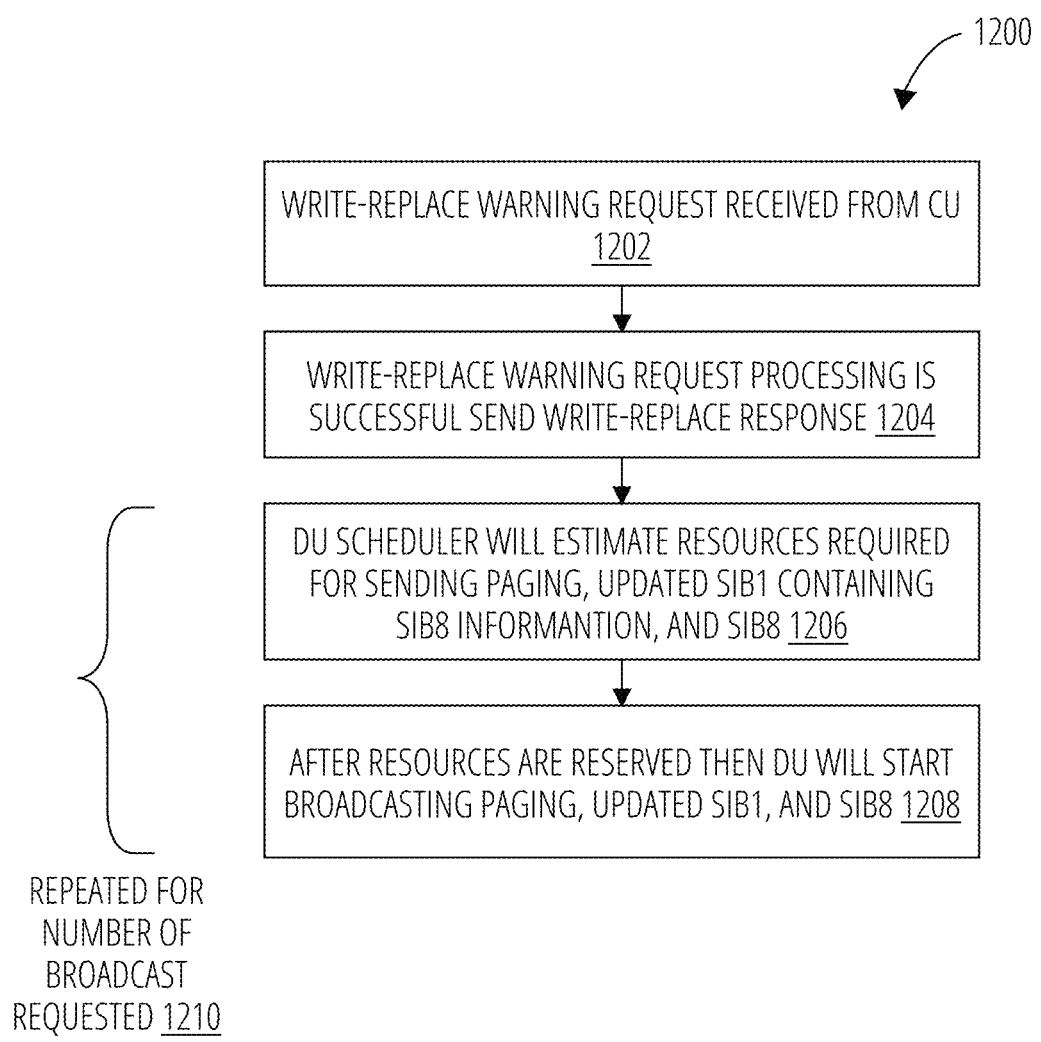
FIG. 12 is a flow diagram of a process for generating and broadcasting SIB8 warning messages, according to one embodiment.

FIG. 12 shows a legacy process 1200 for scheduling CMAS warning messages. This process 1200 entails receiving a write-replace warning request received from a CU at block 1202. A DU will validate the received message identifier, number of broadcasts requested, repetition period, cell to broadcast list, SIB8 content, and other such information.

If validation is successful and the DU will be able to broadcast received CMAS warning messages, then process 1200 entails sending a write-replace response at block 1204. The DU sends a write-replace warning response containing an IE cell broadcast completed area list. If validation is unsuccessful, then the DU sends a write-replace warning response without containing the IE cell broadcast completed area list.

Next, a DU scheduler will estimate resources required for sending paging, updated SIB1 containing SIB8 information, and SIB8 at block 1206. The DU scheduler will consider factors governing scheduling of system information such as the paging cycle, system information modification period, and system information periodicity while reserving resources for broadcasting SIB8. These factors remain the same across all CMAS broadcasting.

Finally, after resources are reserved, then the DU will start broadcasting paging, updated SIB1, and SIB8 at block 1208. The DU starts broadcasting of paging, updated SIB1, and SIB8 in such a way that all UE in the cell should have at least a valid scheduling occasion for receiving paging, updated SIB1, and SIB8.

The latter two blocks 1206 and 1208 are repeated 1210 for a number of broadcasts that are requested.

In the legacy approach, for all the message identifiers, the DU would use the same si-Periodicity, defaultPagingCycle, and modificationPeriodCoeff. And resources would be preempted when no resources are available for scheduling warning SIB. For a higher priority alert, this approach is acceptable as it will help in saving lives as well as property. But for a lower priority alert where some level of delay is permissible, preempting the resources of the UE could potentially result in a poor user experience. For instance, if two alerts get broadcasted with the same priority within a cell loaded environment (as in the conventional approach), the UE resources need to be preempted in order to accommodate both of the CMAS alerts. It may lead to a scenario where higher priority resources allocated to the UE (e.g., URLLC or MIOT) may be released in order to make way for a lower priority alert where some delay is permissible.

In contrast to statically scheduling CMAS warning messages, the disclosed embodiments differentiate CMAS warning messages at the RAN scheduler based on received CMAS message identifiers so as to dynamically prioritize scheduling over air interface by varying system information periodicity or system information modification period (i.e., varying either modificationPeriodCoeff or Paging Cycle). By differentiating different message identifiers and assigning them weightage and priority dynamically, the warnings are effectively scheduled using the air interface resources while broadcasting a CMAS alert.

Figure 13A:
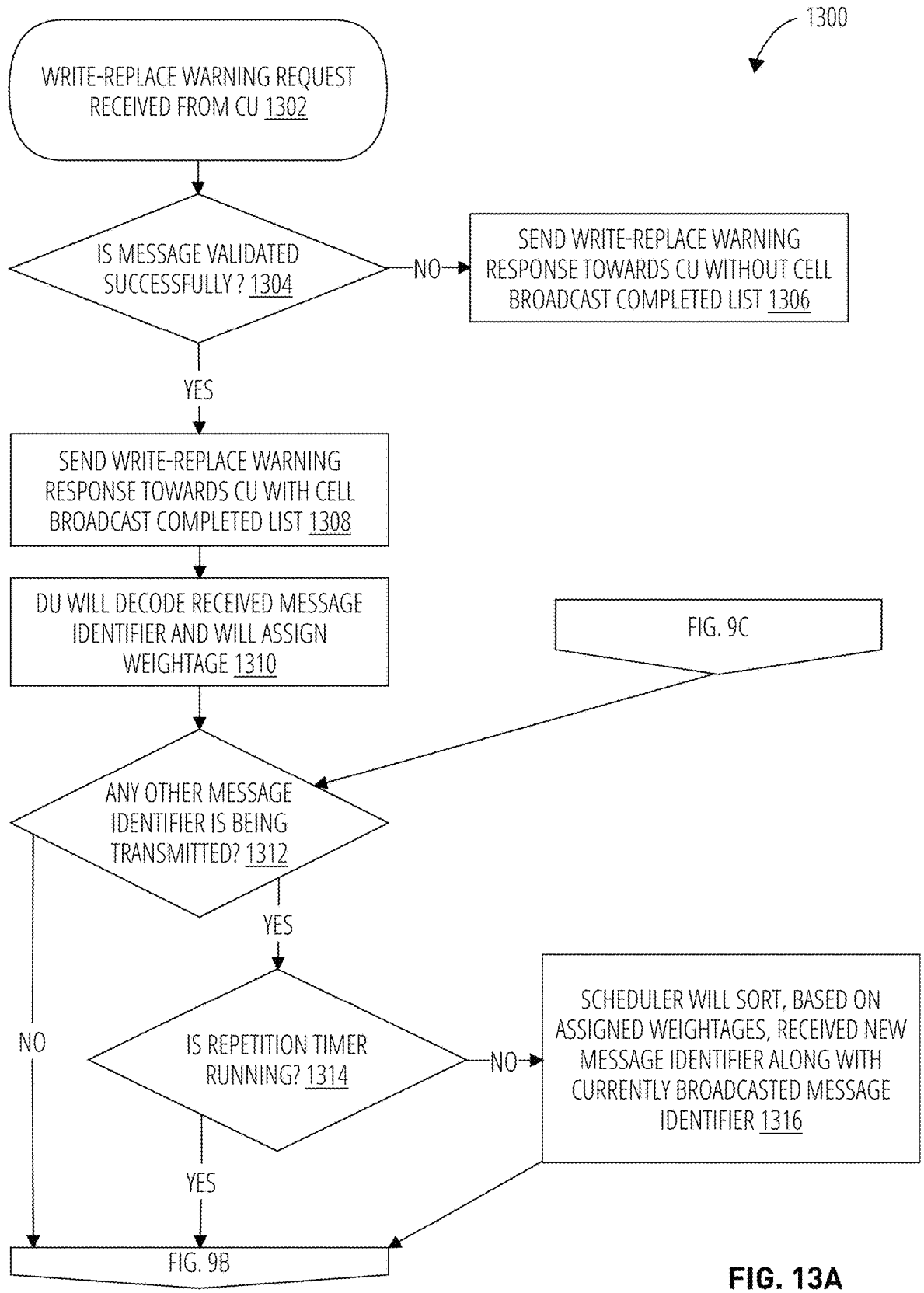
FIG. 13A is a first of three flow diagram portions that collectively show dynamic scheduling of SIB8 warning message broadcasts over Uu interface, according to one embodiment.
Figure 13B:
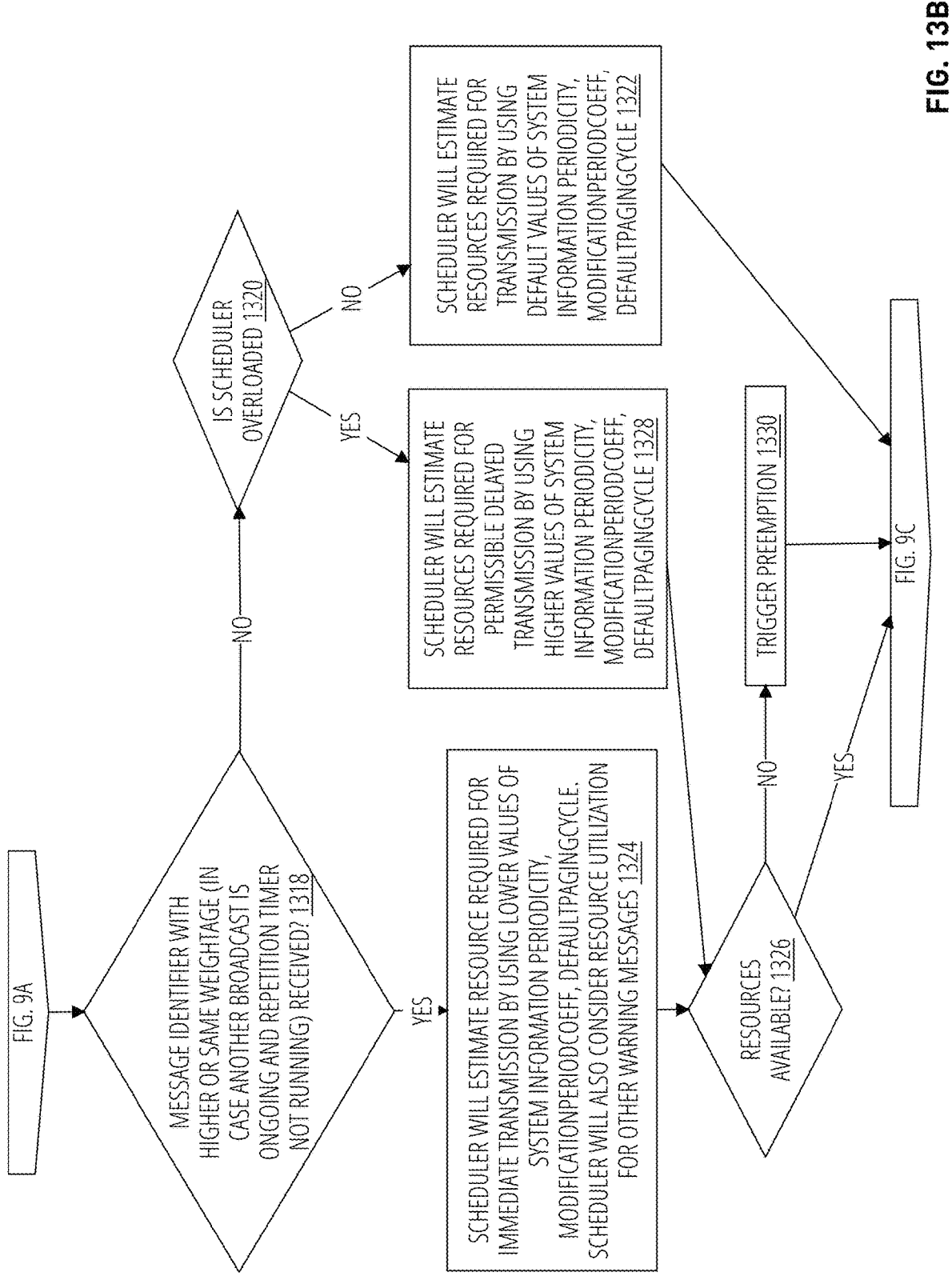
FIG. 13B is a second of three flow diagram portions that collectively show dynamic scheduling of SIB8 warning message broadcasts over Uu interface, according to one embodiment.
Figure 13C:
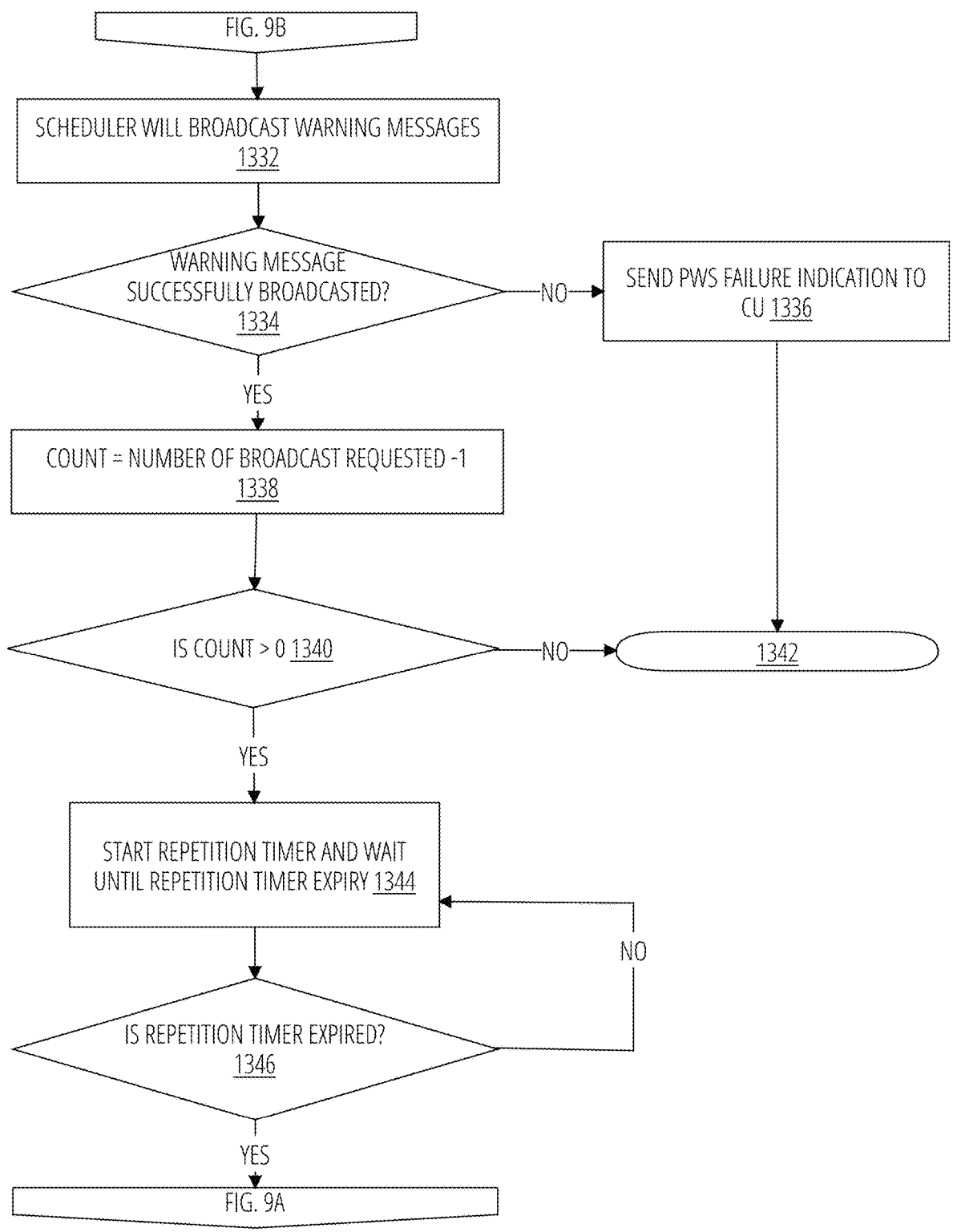
FIG. 13C is a third of three flow diagram portions that collectively show dynamic scheduling of SIB8 warning message broadcasts over Uu interface, according to one embodiment.

For example, FIG. 13A-FIG. 13C collectively show a process 1300 for dynamically scheduling of warning messages over the NR-Uu interface based on priorities and identifiers associated with CMAS warning messages. Initially, at start block 1302, a DU receives a write-replace warning request from a CU. The DU determines at decision block 1304 whether the message can be validated. If not, then at block 1306 the DU sends a write-replace warning response without a cell broadcast completed list. If successfully validated, then at block 1308 the DU sends a write-replace warning response with a cell broadcast completed list.

Next, at block 1310, the DU decodes the received message identifier and then maps the message identifier to a weightage that corresponds to the priority or delay that may be tolerated when broadcasting a message (e.g., as a function of a particular message identifier or group of identifiers). In some embodiments, a message identifier will have a weightage based on the type of alert it is mapped to as per 3GPP TS 23.041 section 9.4.1.2.2. Thus, the weightage is then assigned so as to establish an order for the broadcasts (e.g., as a function of the priority). When assigning weightage factors for a given warning message, the exact implementation of assigned weightage is subject to vendor implementation.

For instance, in a scenario where the DU simultaneously receives multiple CMAS alerts, the DU may prioritize alerts based on assigned weightage. Message identifiers having higher priority will take precedence over lower priority message identifiers while allocating resources over air interface. In one example, assuming that a subscriber does not have any provision to opt out of receiving message identifier 4370 but it may choose to opt out of receiving message identifier 4372, then if the DU simultaneously receives message identifier 4370 and 4372, 4370 may have a higher weightage than 4372. In this example, a message where UEs have options to opt out indicates that the content of the broadcasted warning message should be allocated a lower priority and some level of delay may be implemented while scheduling over air interface in case of congestion. Prioritizing of warning messages over air interface as proposed helps operators efficiently use air interface resources while enhancing user experience across 5G devices ecosystem.

Thus, at block 1312, the DU determines whether any other message identifier is to be transmitted. If not, then the message is processed as explained below. If there are other messages, however, then at decision block 1314 the DU checks whether a repetition timer is running. The repetition timer is explained later with reference to FIG. 16A, but in general when the repetition timer is running for a particular message identifier, warning SIBs will not be broadcast for the said message identifier. If no repetition timer is running (i.e., other warning SIBs are being broadcasted), then at block 1316 the DU scheduler sorts, based on assigned weightages, the received new message identifier along with a currently broadcasted message identifier. Flow then proceeds to decision block 1318 (FIG. 13B).

At decision block 1318, the DU determines whether the message has a higher or same weightage (i.e., when other warning SIBs are being broadcasted). Two scenarios are being checked.

In a first scenario, if no other messages are getting broadcasted, then DU is essentially checking whether a delay or opt out is permissible for the new message. In other words, the DU is not comparing the new message to another specific message in the queue, but it is checking the message against general criteria for determining whether the message is low or high priority. In the absence of a warning message broadcast, the DU scheduler continues with its normal mode of operation checking its conventional attributes for call admission control.

In a second scenario, when other message identifiers are getting broadcasted, the DU scheduler will compare a currently received message identifier with a message identifier of a message already getting broadcasted to determine if a currently received message identifier has higher or same weightage. For instance, if a new message identifier is received at the DU and there already are other message identifiers being broadcasted or the repetition period is running for another message identifier, then the DU scheduler will compare the generated weightage value for the new message identifier with the weightage value of the message identifier for which broadcasting is ongoing or the repetition period is running.

As explained below, derived weightage value is inversely proportional to si-Periodicity, defaultPagingCycle, and modificationPeriodCoeff. The exact values to be used for si-Periodicity, defaultPagingCycle, and modificationPeriodCoeff may be dependent on factors such as received CMAS message identifier in a write-replace warning request, load on the DU scheduler at that instance of time, permissible delay allowed, and other scheduling factors.

In case a lower weightage value is received for a new message identifier, the DU scheduler will begin the process of making the corresponding scheduling adjustment, i.e., an si-Periodicity for warning SIBs that is higher than that of the ongoing broadcast message identifier. For instance, at decision block 1320, the DU checks whether its scheduler is overloaded.

Figure 14:
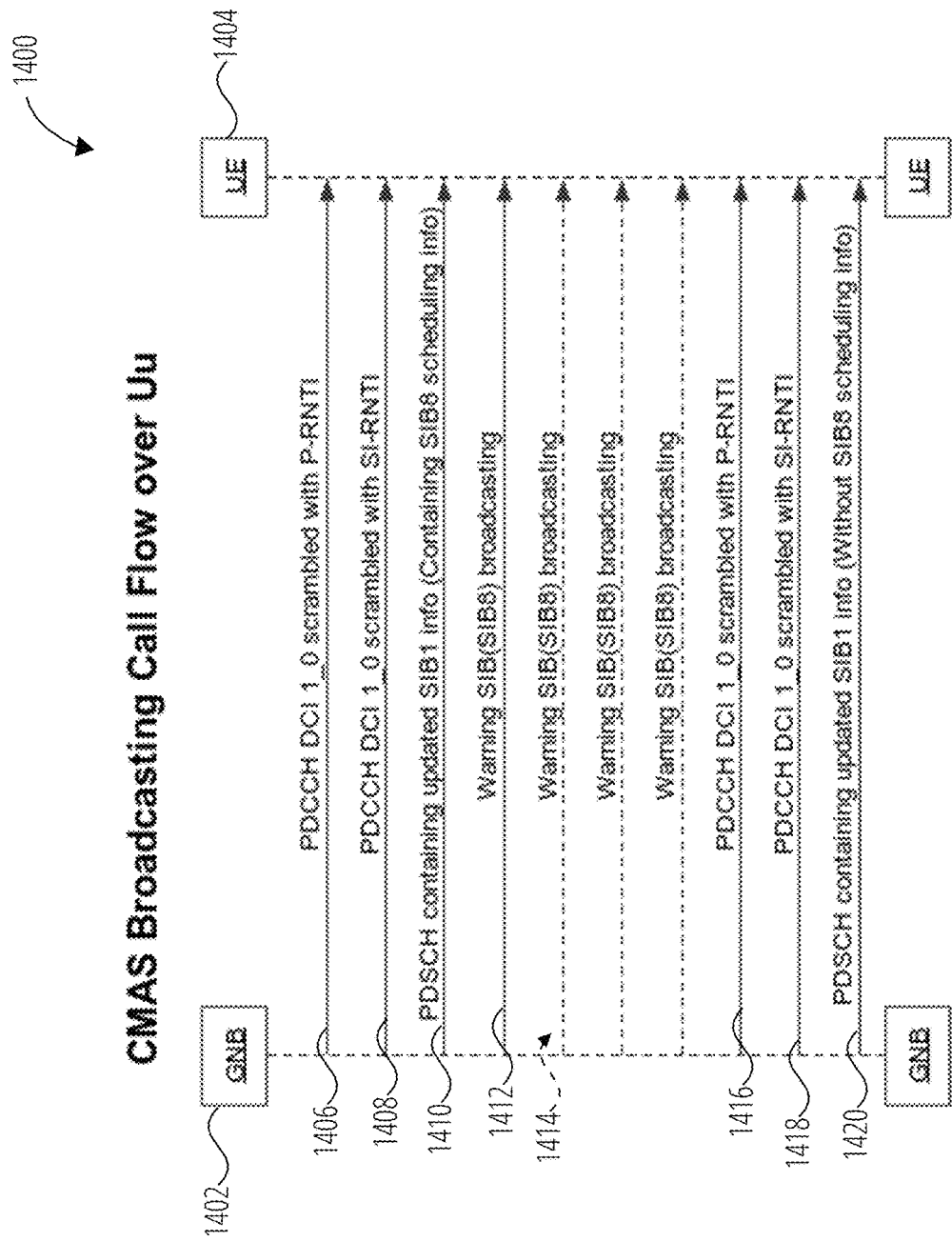
FIG. 14 is a message sequence diagram showing a process for SIB8 warning message broadcasting, according to one embodiment.

If the DU scheduler is not overloaded, then at block 1322 the DU scheduler will estimate resources required for transmission by using default values of system information periodicity for warning SIBs, modificationPeriodCoeff, and defaultPagingCycle (e.g., an estimate to perform process 1400, FIG. 14). The modificationPeriodCoeff and defaultPagingCycle will be used to determine an initial delay before broadcasting of warning SIBs only, and within SIB1 modificationPeriodCoeff and defaultPagingCycle values do not change (remaining the same as configured during initial provisioning by SMO or OAM). Initial delay based on modificationPeriodCoeff and defaultPagingCycle can be calculated as defined in FIG. 16A and FIG. 16B, described later. The estimate will take into consideration the size of the message received with how many segments and how many times it needs to be repeated for how long. Based on message size and number of segments, the DU scheduler estimates how much resources are required, and in some embodiments, resources will be in number of PRB and symbol in resource grid. During resource estimation for the new message identifier, the DU scheduler will consider resources being used for an ongoing message identifier broadcast.

If the DU scheduler is overloaded, then at decision block 1328 the DU scheduler will estimate resources required for permissible delayed transmission by using higher values of system information periodicity for warning SIBs, modificationPeriodCoeff, and defaultPagingCycle (i.e., higher values shown in FIG. 8). The modificationPeriodCoeff and default- PagingCycle will be used to determine an initial delay before broadcasting of warning SIBs only, and within SIB1 the modificationPeriodCoeff and defaultPagingCycle value does not change (remaining the same as configured during initial provisioning by SMO or OAM). Initial delay based on modificationPeriodCoeff and defaultPagingCycle can be calculated as defined in FIG. 16A and FIG. 16B, described later. Permissible delay means how much delay would be acceptable for the broadcast of warning messages without preempting other resources. The higher values that are selected may be any value(s) that are higher than the current value defined in case a certain amount of delay can be tolerated for the received warning message. During a next repetition period of an ongoing message identifier broadcast, values of si-Periodicity for warning SIB broadcasting within SIB1 and default paging cycle with modification period coefficient for initial delay estimation may remain the same or change depending on the loading condition in the DU scheduler.

If the new message is the same or higher weightage at decision block 1318, then at block 1324 the DU may choose to estimate resources based on lower si-Periodicity for warning SIBs for immediate scheduling of SIB8 along with lower defaultPagingCycle and modificationPeriodCoeff for smaller initial delay. Thus, if a similar or higher weightage value is received for a new message identifier, then the DU scheduler will intelligently prioritize the new message identifier while deprioritizing ongoing broadcasts for the message identifier having the lower weightage. For the ongoing message identifier broadcast during the next repetition, in some embodiments the DU will allocate higher si-Periodicity for warning SIBs along with higher default paging cycle and modification period coefficient values for initial delay determination than the newer message identifier in a scheduler overload scenario.

Next, at decision block 1326, the DU checks whether resources are available. It will take into consideration the size of the message received with how many segments and how many times it needs to be repeated for how long. Based on message size and number of segments, the DU scheduler estimates how much resources are required, and resources will be in number of PRB and symbol in resource grid. If resources are not available, then it will skip or stop scheduling of resources towards UEs or downsize currently allocated resources such reduced RBs or symbols for few TTI. If there are insufficient resources, then at block 1330 preemption is triggered. For instance, in a loaded cell, if the DU receives a SIB8 broadcasting request and it does not have resources to broadcast the SIB8, then the DU will preempt resources for UEs in order to broadcast the received CMAS alert. Flow then proceeds to block 1332 (FIG. 13C). For instance, if a UE is using 150 RBs spanning across 13 symbols, then preempting resources means it may reduce the number of RBs or symbols or both. In some cases, the DU may completely not allocate any resource towards UE for few TTI.

If there are sufficient resources, then at block 1332 the DU scheduler will broadcast the warning message according to the estimated si-Periodicity for warning SIBs and received defaultPagingCycle and modificationPeriodCoeff from SMO or OAM during initial provisioning. For other system information, i.e., SIB2, SIB3, SIB4, SIB5, and the like, si-Periodicity will not change at the DU.

The DU determines at decision block 1334 whether the message is successfully broadcasted. If not, then at block 1336 the DU sends a PWS failure indication to the CU and the flow stops at done block 1342.

If the message is successfully broadcasted, then at block 1338 a counter of the number of broadcasts is decremented. Once the count is zero at decision block 1340, the flow stops at done block 1342. Otherwise, a repetition timer is run and polled at the loop of block 1344 and decision block 1346. Once the timer is expired, flow returns to decision block 1312 (FIG. 13A).

FIG. 14 shows an example process 1400 for CMAS broadcasting over the Uu (air) interface from a gNB 1402 to a UE 1404. In this example, process 1400 is performed by gNB 1402, but in other embodiments the process could be performed by an O-RAN.

As explained previously in connection with block 1322 (FIG. 13B), in this example a gNB-DU scheduler uses default values for si-Periodicity, modification period coefficient, and default paging cycle configured during initial provisioning by OAM or SMO. Accordingly, process 1400 may be implemented at block 1332 (FIG. 13C).

The gNB-DU in gNB 1402 schedules warning messages in such a way that all UEs across the cells served by the gNB-DU would have at least one valid paging occasion to read paging for warning information. The gNB-DU schedules paging information using a Layer 1 paging mechanism. Specifically, DCI format 1_0 is constructed with CRC scrambled by paging radio network temporary identifier (P-RNTI), i.e., PDCCH DCI 1_0 scrambled with P-RNTI 1406 with the value of the P-RNTI fixed (e.g., hex FFFE). An example of PDCCH DCI 1_0 scrambled with P-RNTI 1406 is shown in FIG. 10 of the '240 application. The gNB-DU also generates DCI scrambled with system information RNTI (SI-RNTI) used for broadcast of system information. Accordingly, PDCCH DCI 1_0 scrambled with SI-RNTI 1408 includes information shown in FIG. 12 of the '240 application.

Next, the gNB-DU generates a PDSCH containing updated SIB1 information with warning SIB8 information 1410. The updated SIB1 contains default scheduling information of warning SIBs (SIB8s, in this example). For instance, once UE 1404 reads paging, it will proceed in acquiring SIB1 that contains scheduling information of warning SIB8s within IE si-SchedulingInfo. Scheduling information for SIB8 contains si-BroadcastStatus, si-Periodicity, and sib-MappingInfo. Additionally, within sib-MappingInfo contains an areaScope IE. The areaScope IE is optional, which may or may not be configured. This IE will come into the picture when a cell is subdivided for a finer service granularity, i.e., a cell may contain one or more areas.

Next, gNB 1402 broadcasts warning SIB8 1412. As UE 1404 already knows the location where warning SIB8s are getting broadcasted (after acquiring SIB1), UE 1404 can proceed and acquire warning SIB SIB8 1412. Optionally, gNB 1402 will repeat 1414 scheduling of warning SIB8 1412 multiple times based on the number of broadcasts requested in its write-replace warning request.

Finally, the gNB-DU provides PDCCH DCI 1_0 scrambled with P-RNTI 1416, PDCCH DCI 1_0 scrambled with SI-RNTI 1418, and PDSCH containing updated SIB1 information without warning SIB scheduling information 1420 to clear the scheduled warning message transmissions once warning messages are successfully delivered.

Figure 15:
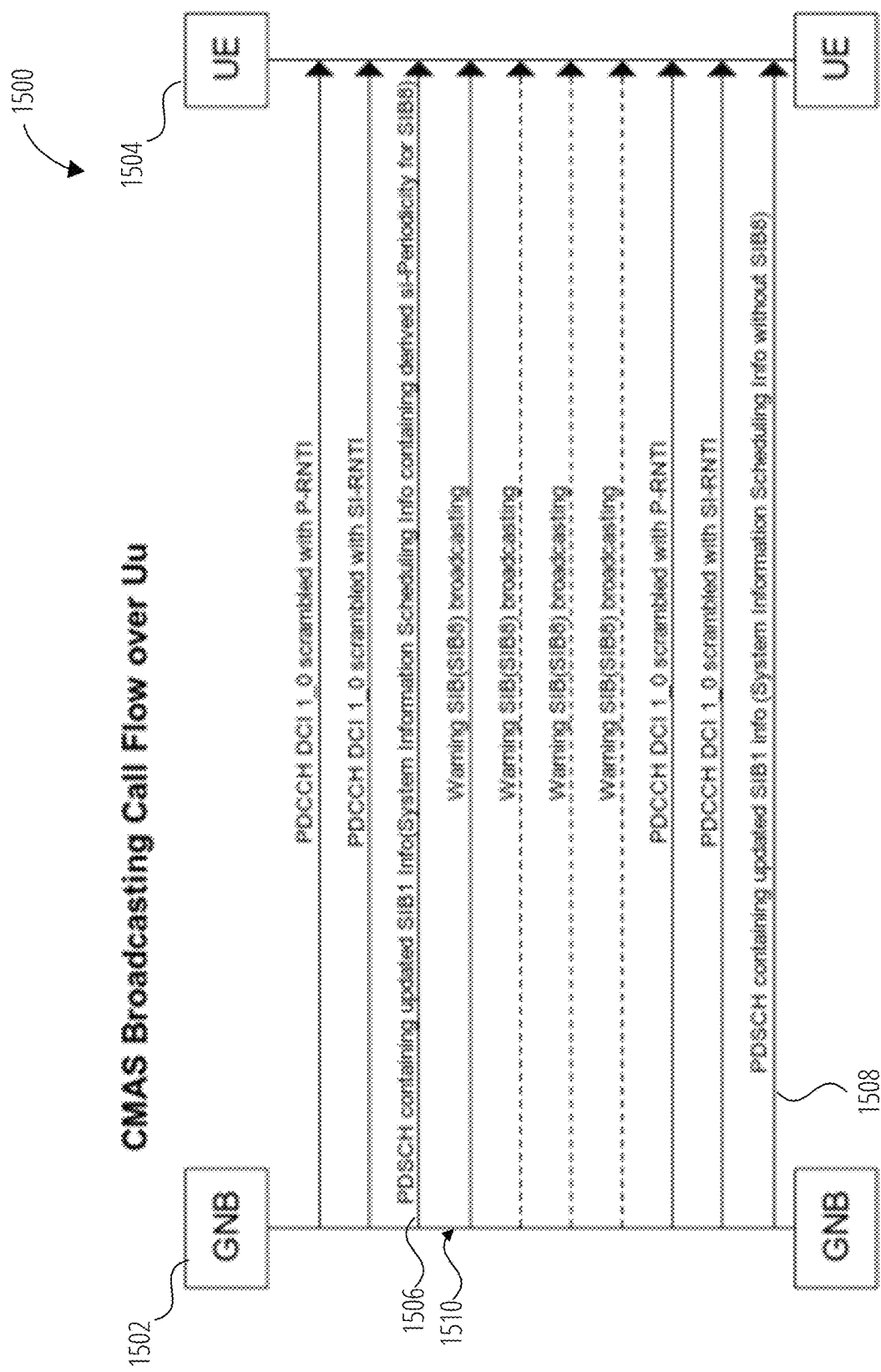
FIG. 15 is a message sequence diagram showing a process for SIB8 warning message broadcasting, according to one embodiment.

FIG. 15 shows an example process 1500 for CMAS broadcasting over the Uu (air) interface from a gNB 1502 to a UE 1504. In this example, process 1500 is performed by gNB 1502, but in other embodiments the process could be performed by an O-RAN.

As explained previously in connection with block 1324 or block 1328 (FIG. 13B), in this example a gNB-DU scheduler uses updated values for si-Periodicity derived dynamically by scheduler based on resource availability. Accordingly, process 1500 may be implemented at block 1332 (FIG. 13C). Moreover, process 1500 is similar to process 1400 (FIG. 14) except instead of the scheduler using default si-Periodicity for warning SIBs configured by OAM or SMO during initial provisioning, the scheduler dynamically derives si-Periodicity. Accordingly, gNB 1502 provides a PDSCH containing updated SIB1 information scheduling warning SIB8 1506. SIBs 1510 are then broadcast. Once broadcasting of SIB8 is completed, the scheduler will remove 1508 SIB8 scheduling information from SIB1.

Figure 16A:
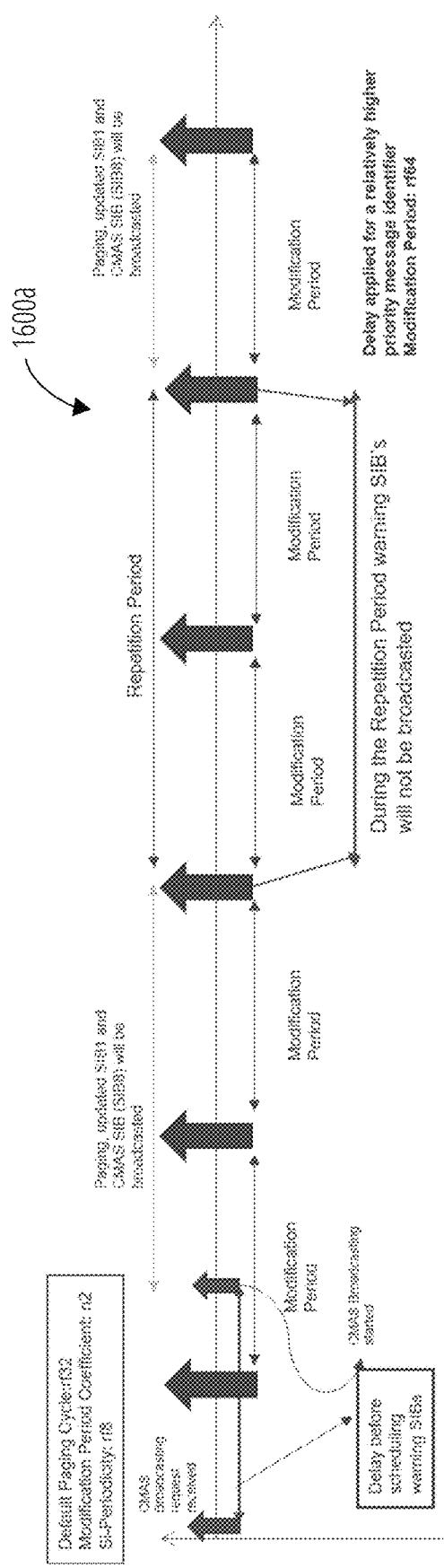
FIG. 16A and FIG. 16B are a pair of annotated timing diagram showing dynamic scheduling for SIB8 warning messages, according to one embodiment.

FIG. 16A shows a warning message broadcast timing diagram 1600a in which a repetition period suppresses the broadcasting of warning SIBs. In this example, the repetition timer is not controlled by RAN but provided by a CBCF. The repetition timer comes into play in determining the timing parameter for RAN scheduling intervals between each repetition of warning SIBs.

FIG. 16A shows how high-priority messages are assigned appropriate weight factors to ensure they get the priority treatment at the scheduler prior to their broadcast. As explained previously, the scheduler determines an initial delay applicable before starting broadcasting of warning SIBs. An initial delay duration before starting scheduling of warning SIBs is derived from the modification period. The modification period is determined by default paging cycle× modification period coefficient.

In warning message broadcast timing diagram 1600a, either a higher priority message identifier is received or a lower priority message identifier is received when the scheduler was not overloaded, so the scheduler uses a lower value for default paging cycle (i.e., rf32) and modification period coefficient (i.e., n2) in determining the initial delay before starting scheduling of warning SIBs. Thus, the initial delay will be around rf64 before warning SIBs gets scheduled over air interface. The scheduler may also temporally align the initial delay in a such a way that starting of warning SIB scheduling will align with starting of the modification period. With this approach the scheduler should be able to schedule all UEs in a single modification period, as all UE have at least one paging occasion.

When broadcasting of a warning message is started over air interface, it will use pre-provisioned values of default paging cycle and modification period coefficient provided during initial provisioning by SMO or OAM within SIB1, respectively, in pech-Config and bcch-Config and irrespective of priority of received message identifier.

If starting of warning SIB broadcasting is not aligned with the modification period, then in some embodiments the scheduler would schedule warning SIB broadcasting across the current modification period as well as the next modification period in order to schedule all UEs. The scheduler will also dynamically compute si-Periodicity as per priority of received message identifier. For instance, in FIG. 16A, as the broadcasting is being done for a higher priority message identifier or a lower priority message identifier when the scheduler is not overloaded, an si-Periodicity of rf8 (i.e., a lowest value in FIG. 8) is selected.

For a next repetition of warning SIB broadcasting, the scheduler may have to re-determine the initial delay based on scheduler overload as well other message identifiers being broadcasted at that instance of time. Accordingly, the scheduler may use higher default paging cycle and modification period coefficient than that used in the first instance in determining initial delay. Similarly, si-Periodicity will be dynamically determined for each repetition of warning messages and is included in the updated SIB1 containing scheduling information for warning SIBs (e.g., in PDSCH 1506, FIG. 15).

Values of default paging cycle and modification period coefficient being broadcasted within SIB1 will remain constant as provisioned initially by SMO or OAM.

Figure 16B:
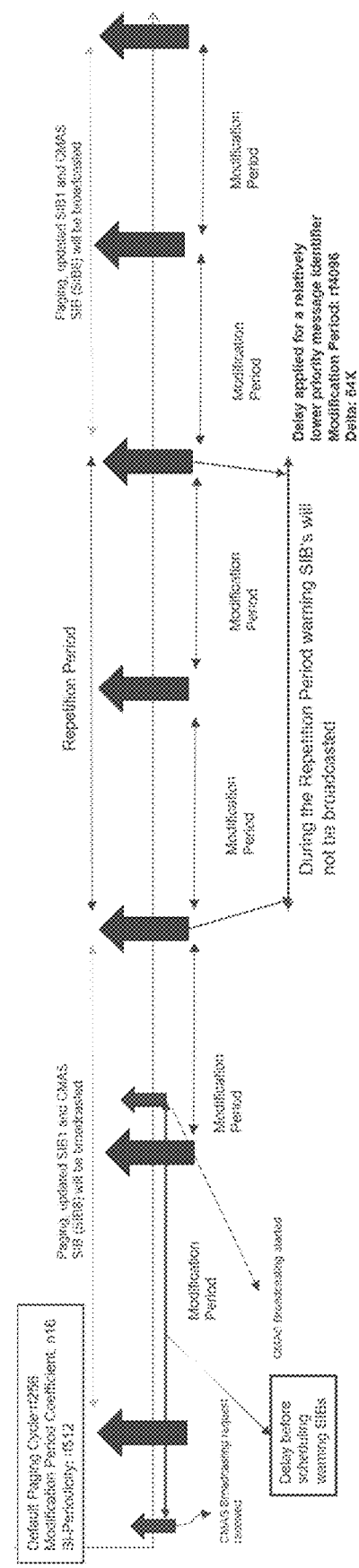

FIG. 16B shows another warning message broadcast timing diagram 1600b in which low priority message broadcasting will be delayed longer taking into consideration the radio resources available in the system. If a message identifier with lowest priority is received, then the scheduler may use a higher value of the default paging cycle, i.e., rf256 and modification period coefficient, i.e., n16 for an initial delay. This will help in the initial delay of scheduling warning message transfer by rf256×16, which is 4096 ms without preempting any resources.

As shown in FIG. 16B, a lower priority message identifier is received when the scheduler is overloaded, so the scheduler uses a higher value for the default paging cycle (i.e., rf256) and modification period coefficient (i.e., n16) in determining the initial delay before starting scheduling of warning SIBs. Initial delay will be around rf4096 before warning SIBs gets scheduled over air interface.

The scheduler may also temporally align the initial delay in a such a way that starting of warning SIB scheduling will align with starting of the modification period. With this approach the scheduler should be able to schedule all UEs in a single modification period as all UEs have at least one paging occasion. The scheduler will also dynamically compute si-Periodicity as per priority of received message identifier. In FIG. 16B, as the broadcasting is being done for a lower priority message identifier when the scheduler is overloaded, an si-Periodicity of rf512 (i.e., a highest value in FIG. 8) is selected.

During next repetition of warning SIB broadcasting, the scheduler will check for resource availability and overload scenario to determine the initial delay and si-Periodicity.

Figure 17:
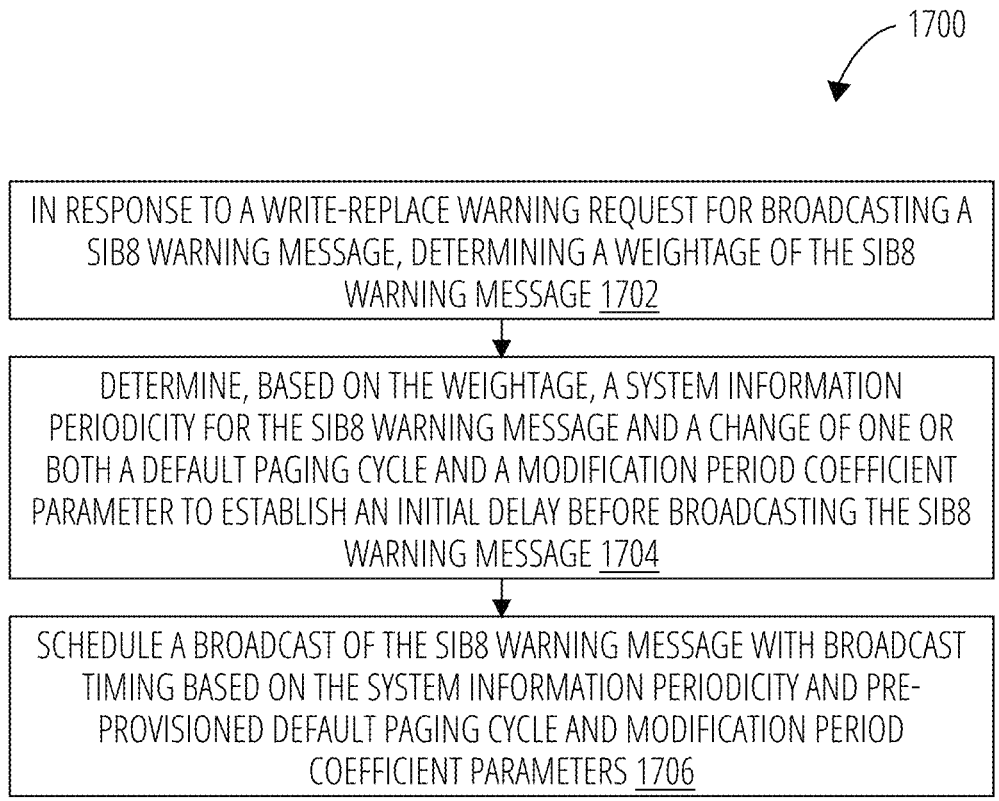
FIG. 17 is a flow diagram of a process for dynamic scheduling for SIB8 warning messages, in accordance with one embodiment.

FIG. 17 shows a process 1700, performed by a DU for a RAN node in a 5G communication network defining one or more cells, of dynamically scheduling SIB8 warning messages. In block 1702, in response to a write-replace warning request for broadcasting a SIB8 warning message, process 1700 determines a weightage of the SIB8 warning message. In block 1704, process 1700 determines, based on the weightage, a system information periodicity for the SIB8 warning message and a change of one or both a default paging cycle and a modification period coefficient parameter to establish an initial delay before broadcasting the SIB8 warning message. In block 1706, process 1700 schedules a broadcast of the SIB8 warning message with broadcast timing based on the system information periodicity and pre-provisioned default paging cycle and modification period coefficient parameters.

Process 1700 may also entail the weightage being based on a message identifier of the SIB8 warning message.

Process 1700 may also entail broadcasting the SIB8 warning message and starting a repetition timer for repeating the broadcasting.

Process 1700 may also entail determining whether a scheduler of the DU is overloaded.

Process 1700 may also entail the SIB8 warning message being a first SIB8 warning message, and dynamically scheduling a broadcast of a second SIB8 warning message with an associated initial delay that is different from the initial delay of the first SIB8 warning message.

Process 1700 may also entail the change being a higher value of one or both of the default paging cycle and the modification period coefficient parameters.

Process 1700 may also entail the change is a lower value of one or both of the default paging cycle and the modification period coefficient parameters.

Process 1700 may also entail broadcasting the SIB8 warning message and starting a repetition timer in response to the write-replace warning request indicating multiple broadcasts are requested.

Process 1700 may also entail re-determining the initial delay based on scheduler overload as well as another concurrent message identifier being broadcasted at that instance of time.

Process 1700 may also entail estimating resources required for broadcasting with the change.

Process 1700 may also entail triggering preemption in response to available resources being insufficient after a permissible delay.

Process 1700 may also entail temporally aligning the initial delay such that a start of the broadcasting aligns with a start of a modification period.

Figure 18:
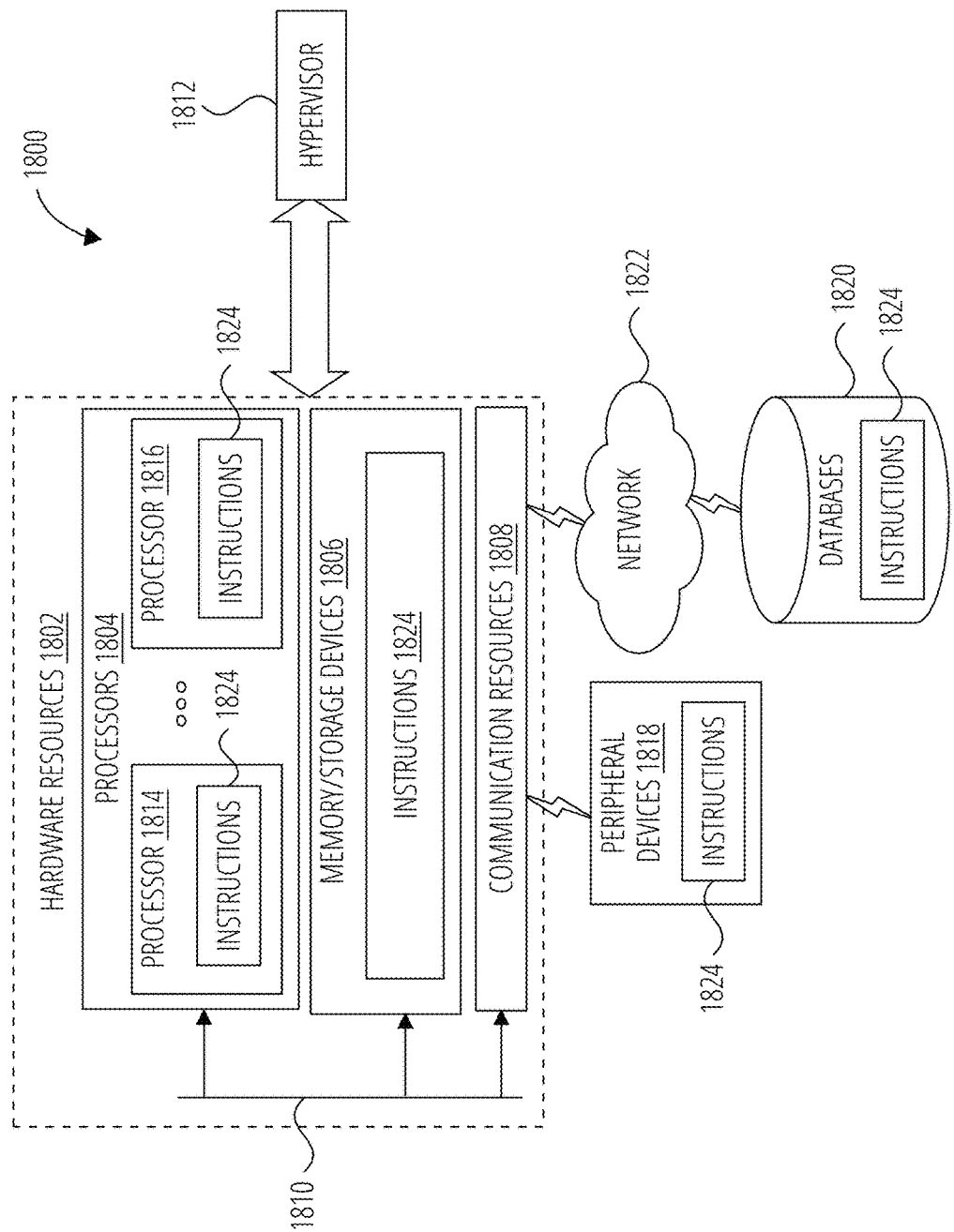
FIG. 18 is a block diagram of computing components for performing the disclosed procedures, in accordance with one embodiment.

FIG. 18 is a block diagram illustrating components 1800, according to some example embodiments, able to read instructions from a machine-readable or computer-readable medium (e.g., a non-transitory machine-readable storage medium) and perform any one or more of the methods discussed herein, such as process 1300 (FIG. 13A-FIG. 13C), process 1400 (FIG. 14), process 1500 (FIG. 15), and process 1700 (FIG. 17).

Specifically, FIG. 18 shows a diagrammatic representation of hardware resources 1802 including one or more processors 1804 (or processor cores), one or more memory/storage devices 1806, and one or more communication resources 1808, each of which may be communicatively coupled via a bus 1810. For embodiments where node virtualization (e.g., NFV) is utilized, a hypervisor 1812 may be executed to provide an execution environment for one or more network slices/sub-slices to utilize hardware resources 1802.

Processors 1804 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1814 and a processor 1816.

Memory/storage devices 1806 may include main memory, disk storage, or any suitable combination thereof. Memory/storage devices 1806 may include, but are not limited to, any type of volatile or non-volatile memory such as dynamic random-access memory (DRAM), static random-access memory (SRAM), erasable programmable read-only memory (EPROM), electrically erasable programmable read-only memory (EEPROM), Flash memory, solid-state storage, etc.

Communication resources 1808 may include interconnection or network interface components or other suitable devices to communicate with one or more peripheral devices 1818 or one or more databases 1820 via a network 1822. For example, communication resources 1808 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1824 may comprise software, a program, an application, an applet, an app, or other executable code for causing at least any of processors 1804 to perform any one or more of the methods discussed herein. Instructions 1824 may reside, completely or partially, within at least one of processors 1804 (e.g., within the processor's cache memory), memory/storage devices 1806, or any suitable combination thereof. Furthermore, any portion of instructions 1824 may be transferred to hardware resources 1802 from any combination of peripheral devices 1818 or databases 1820. Accordingly, the memory of processors 1804, memory/storage devices 1806, peripheral devices 1818, and databases 1820 are examples of computer-readable and machine-readable media.

In light of this disclosure, skilled persons will appreciate that many changes may be made to the details of the above-described embodiments without departing from the underlying principles of the invention. The scope of the present invention should, therefore, be determined only by claims and equivalents.

What is claimed is:

1. A method, performed by a distributed unit (DU) for a radio access network (RAN) node in a 5G communication network defining one or more cells, of dynamically scheduling system information block (SIB8) warning messages, the method comprising:
   in response to a write-replace warning request for broadcasting a SIB8 warning message, determining a weightage of the SIB8 warning message;
   determining, based on the weightage, a system information periodicity for the SIB8 warning message and a change of one or both a default paging cycle and a modification period coefficient parameter so that the change corresponds to an initial delay before broadcasting the SIB8 warning message; and
   scheduling a broadcast of the SIB8 warning message with broadcast timing based on the system information periodicity and pre-provisioned default paging cycle and modification period coefficient parameters.

2. The method of claim 1, in which the weightage is based on a message identifier of the SIB8 warning message.

3. The method of claim 1, further comprising:
   broadcasting the SIB8 warning message; and
   starting a repetition timer for repeating the broadcasting.

4. The method of claim 1, further comprising determining whether a scheduler of the DU is overloaded.

5. The method of claim 1, in which the SIB8 warning message is a first SIB8 warning message, the method further comprising dynamically scheduling a broadcast of a second SIB8 warning message with an associated initial delay that is different from the initial delay of the first SIB8 warning message.

6. The method of claim 1, in which the change is a higher value of one or both of the default paging cycle and the modification period coefficient parameters.

7. The method of claim 1, in which the change is a lower value of one or both of the default paging cycle and the modification period coefficient parameters.

8. The method of claim 1, further comprising:
   broadcasting the SIB8 warning message; and
   starting a repetition timer in response to the write-replace warning request indicating multiple broadcasts are requested.

9. The method of claim 8, further comprising re-determining the initial delay based on scheduler overload as well as another concurrent message identifier being broadcasted at that instance of time.

10. The method of claim 1, further comprising estimating resources required for broadcasting with the change.

11. The method of claim 10, further comprising triggering preemption in response to available resources being insufficient after a permissible delay.

12. The method of claim 1, further comprising temporally aligning the initial delay such that a start of the broadcasting aligns with a start of a modification period.

13. A non-transitory computer-readable storage medium of a distributed unit (DU) for a radio access network (RAN) node in a 5G communication network defining one or more cells, the computer-readable storage medium including instructions that when executed by the DU, cause it to:
   in response to a write-replace warning request for broadcasting a system information block (SIB8) warning message, determine a weightage of the SIB8 warning message;
   determine, based on the weightage, a system information periodicity for the SIB8 warning message and a change of one or both of a default paging cycle and a modification period coefficient parameter so that the change corresponds to an initial delay before broadcasting the SIB8 warning message; and
   schedule a broadcast of the SIB8 warning message with broadcast timing based on the system information periodicity and pre-provisioned default paging cycle and modification period coefficient parameters.

14. The computer-readable storage medium of claim 13, in which the weightage is based on a message identifier of the SIB8 warning message.

15. The computer-readable storage medium of claim 13, in which the instructions further configure the DU to:
   broadcast the SIB8 warning message; and
   start a repetition timer for repeating the broadcast.

16. The computer-readable storage medium of claim 13, in which the instructions further configure the DU to determine whether a scheduler of the DU is overloaded.

17. The computer-readable storage medium of claim 13, in which the SIB8 warning message is a first SIB8 warning message, and in which the instructions further configure the DU to dynamically schedule a broadcast of a second SIB8 warning message with an associated initial delay that is different from the initial delay of the first SIB8 warning message.

18. The computer-readable storage medium of claim 13, in which the change is a higher value of one or both of the default page cycle and the modification period coefficient parameters.

19. The computer-readable storage medium of claim 13, in which the change is a lower value of one or both of the default page cycle and the modification period coefficient parameters.

20. The computer-readable storage medium of claim 13, in which the instructions further configure the DU to:
   broadcast the SIB8 warning message; and
   start a repetition timer in response to the write-replace warning request indicating multiple broadcasts are requested.

21. The computer-readable storage medium of claim 20, in which the instructions further configure the DU to re-determine the initial delay based on scheduler overload as well as another concurrent message identifier being broadcasted at that instance of time.

22. The computer-readable storage medium of claim 13, in which the instructions further configure the DU to estimate resources required for broadcasting with the change.

23. The computer-readable storage medium of claim 22, in which the instructions further configure the DU to trigger preemption in response to available resources being insufficient after a permissible delay.

24. The computer-readable storage medium of claim 13, in which the instructions further configure the DU to temporally align the initial delay such that a start of the broadcasting aligns with a start of a modification period.

* * * * *